US012149893B2

(12) United States Patent
Burwinkel et al.

(10) Patent No.: US 12,149,893 B2
(45) Date of Patent: Nov. 19, 2024

(54) HEARING ASSISTANCE SYSTEM WITH ENHANCED FALL DETECTION FEATURES

(71) Applicant: Starkey Laboratories, Inc., Eden Prairie, MN (US)

(72) Inventors: Justin R. Burwinkel, Eden Prairie, MN (US); Penny A. Tyson, Edina, MN (US); Buye Xu, Sammamish, WA (US); Darrell R. Bennington, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 88 days.

(21) Appl. No.: 17/673,461

(22) Filed: Feb. 16, 2022

(65) Prior Publication Data

US 2022/0248153 A1 Aug. 4, 2022

Related U.S. Application Data

(63) Continuation of application No. 16/714,339, filed on Dec. 13, 2019, now Pat. No. 11,277,697.

(Continued)

(51) Int. Cl.
*H04R 25/00* (2006.01)
*G08B 21/04* (2006.01)

(52) U.S. Cl.
CPC ....... *H04R 25/609* (2019.05); *G08B 21/0446* (2013.01); *H04R 25/554* (2013.01); *H04R 2225/39* (2013.01); *H04R 2225/55* (2013.01)

(58) Field of Classification Search
CPC ................ H04R 25/609; H04R 25/554; H04R 2225/39; H04R 2225/55; G08B 21/0446
See application file for complete search history.

(56) References Cited

U.S. PATENT DOCUMENTS 5,913,310 A 6/1999 Brown
6,186,145 B1 2/2001 Brown
(Continued)

FOREIGN PATENT DOCUMENTS

EP 0799597 10/1997
EP 1229508 8/2002
(Continued)

OTHER PUBLICATIONS

"Communication Pursuant to Article 94(3) EPC," for European Patent Application No. 19839777.0 mailed Aug. 18, 2023 (5 pages).
(Continued)

*Primary Examiner* — Sunita Joshi
(74) *Attorney, Agent, or Firm* — Pauly, DeVries Smith & Deffner LLC

(57) ABSTRACT

Embodiments herein relate to devices and related systems and methods for detecting falls. In an embodiment, a hearing assistance device is included having a first control circuit and a first motion sensor. The first motion sensor can be disposed in a fixed position relative to a head of a subject wearing the hearing assistance device. A first microphone and a first transducer for generating sound can be in operational communication with the first control circuit. The first control circuit can be configured to evaluate data from one or more sensors to detect a possible fall of a subject in physical contact with the hearing assistance device. The device can be configured to wirelessly transmit data regarding a possible fall to another device including an indication of whether the possible fall was detected binaurally or monoaurally. Other embodiments are included herein.

12 Claims, 18 Drawing Sheets

Related U.S. Application Data

(60) Provisional application No. 62/944,225, filed on Dec. 5, 2019, provisional application No. 62/780,223, filed on Dec. 15, 2018.

(56) References Cited

U.S. PATENT DOCUMENTS

| | | | |
|---|---|---|---|
| 6,326,918 | B1 | 12/2001 | Stewart |
| 6,475,161 | B2 | 11/2002 | Teicher et al. |
| 6,568,396 | B1 | 5/2003 | Anthony |
| 6,609,523 | B1 | 8/2003 | Anthony |
| 6,647,257 | B2 | 11/2003 | Owensby |
| D487,409 | S | 3/2004 | Philipson |
| 6,758,218 | B2 | 7/2004 | Anthony |
| 6,816,878 | B1 | 11/2004 | Zimmers et al. |
| 6,836,667 | B1 | 12/2004 | Smith |
| 7,007,327 | B2 | 3/2006 | Ogawa et al. |
| 7,139,820 | B1 | 11/2006 | O'Toole et al. |
| 7,282,031 | B2 | 10/2007 | Hendrich |
| 7,294,107 | B2 | 11/2007 | Simon et al. |
| 7,411,493 | B2 | 8/2008 | Smith |
| 7,450,954 | B2 | 11/2008 | Randall |
| 7,490,611 | B2 | 2/2009 | Bromwich |
| 7,602,930 | B2 | 10/2009 | Kasztelan |
| 7,612,681 | B2 | 11/2009 | Azzaro et al. |
| 7,682,308 | B2 | 3/2010 | Hendrich |
| 7,742,774 | B2 | 6/2010 | Oh et al. |
| 7,892,180 | B2 | 2/2011 | Epley |
| 7,899,621 | B2 | 3/2011 | Breed et al. |
| 8,092,398 | B2 | 1/2012 | Weinberg et al. |
| 8,150,044 | B2 | 4/2012 | Goldstein et al. |
| 8,162,846 | B2 | 4/2012 | Epley |
| 8,169,938 | B2 | 5/2012 | Duchscher et al. |
| 8,308,665 | B2 | 11/2012 | Harry et al. |
| 8,442,245 | B2 | 5/2013 | Wurzbacher et al. |
| 8,452,273 | B1 | 5/2013 | Khomenko et al. |
| 8,494,507 | B1 | 7/2013 | Tedesco et al. |
| 8,559,914 | B2 | 10/2013 | Jones |
| 8,585,589 | B1 | 11/2013 | Cinberg |
| 8,652,040 | B2 | 2/2014 | LeBoeuf et al. |
| 8,737,951 | B2 | 5/2014 | Jones et al. |
| 9,049,558 | B2 | 6/2015 | Jones et al. |
| 9,149,222 | B1 | 10/2015 | Zets et al. |
| 9,167,356 | B2 | 10/2015 | Higgins et al. |
| 9,179,862 | B2 | 11/2015 | Stergiou et al. |
| 9,210,518 | B2 | 12/2015 | Zhang |
| 9,216,132 | B2 | 12/2015 | Aoki et al. |
| 9,219,964 | B2 | 12/2015 | Merks |
| D747,554 | S | 1/2016 | Daniel |
| 9,226,706 | B2 | 1/2016 | Uehara et al. |
| 9,313,585 | B2 | 4/2016 | Lunner |
| 9,392,966 | B2 | 7/2016 | Ten Kate |
| 9,414,784 | B1 | 8/2016 | Berme et al. |
| 9,426,582 | B2 | 8/2016 | Pontoppidan |
| 9,452,101 | B2 | 9/2016 | Tomlinson et al. |
| 9,605,390 | B2 | 3/2017 | Penland |
| 9,607,498 | B2 | 3/2017 | Osorio |
| 9,769,577 | B2 | 9/2017 | Shennib |
| 9,848,273 | B1 | 12/2017 | Helwani et al. |
| 9,877,668 | B1 | 1/2018 | Sarkar et al. |
| 9,918,663 | B2 | 3/2018 | Singhatat |
| 9,936,916 | B2 | 4/2018 | Sahin |
| 9,999,377 | B2 | 6/2018 | Osorio |
| 10,015,579 | B2 | 7/2018 | Boesen |
| 10,140,833 | B1 | 11/2018 | Jacobson et al. |
| 10,149,798 | B2 | 12/2018 | Roth |
| 10,178,970 | B2 | 1/2019 | Oddsson et al. |
| 10,242,590 | B2 | 3/2019 | Yu |
| 10,258,257 | B2 | 4/2019 | Greene |
| 10,262,517 | B2 | 4/2019 | Bobda |
| 10,271,790 | B2 | 4/2019 | Lee |
| 10,319,209 | B2 | 6/2019 | Carlton-Foss |
| 10,587,964 | B2 | 3/2020 | Shennib |
| 10,624,559 | B2 | 4/2020 | Bhunia et al. |
| 10,799,698 | B2 | 10/2020 | Howard |
| 11,277,697 | B2 | 3/2022 | Burwinkel et al. |
| 11,559,251 | B2 | 1/2023 | Burwinkel et al. |
| 11,638,563 | B2 | 5/2023 | Burwinkel et al. |
| 2002/0188217 | A1 | 12/2002 | Farwell |
| 2004/0234933 | A1 | 11/2004 | Dawson et al. |
| 2005/0046576 | A1 | 3/2005 | Julian et al. |
| 2005/0240378 | A1 | 10/2005 | Smith et al. |
| 2005/0273017 | A1 | 12/2005 | Gordon |
| 2006/0250260 | A1 | 11/2006 | Albert et al. |
| 2006/0251334 | A1 | 11/2006 | Oba et al. |
| 2006/0282021 | A1 | 12/2006 | DeVaul et al. |
| 2007/0177103 | A1 | 8/2007 | Migliaccio et al. |
| 2007/0197881 | A1 | 8/2007 | Wolf et al. |
| 2007/0200927 | A1 | 8/2007 | Krenik |
| 2007/0276270 | A1 | 11/2007 | Tran |
| 2008/0021731 | A1 | 1/2008 | Rodgers |
| 2008/0111677 | A1 | 5/2008 | Kolz et al. |
| 2008/0129518 | A1 | 6/2008 | Carlton-Foss |
| 2008/0146890 | A1 | 6/2008 | LeBoeuf et al. |
| 2008/0186189 | A1 | 8/2008 | Azzaro et al. |
| 2009/0058660 | A1 | 3/2009 | Torch |
| 2009/0232357 | A1 | 9/2009 | Angell et al. |
| 2009/0240170 | A1 | 9/2009 | Rowley et al. |
| 2009/0240172 | A1 | 9/2009 | Fernandez et al. |
| 2009/0299622 | A1 | 12/2009 | Denaro |
| 2009/0322513 | A1 | 12/2009 | Hwang et al. |
| 2010/0010832 | A1 | 1/2010 | Boute et al. |
| 2010/0049095 | A1 | 2/2010 | Bunn et al. |
| 2010/0075806 | A1 | 3/2010 | Montgomery |
| 2010/0141439 | A1 | 6/2010 | Lunner |
| 2010/0179389 | A1 | 7/2010 | Moroney et al. |
| 2012/0075464 | A1 | 3/2012 | Derenne et al. |
| 2012/0092156 | A1 | 4/2012 | Tran |
| 2012/0101411 | A1 | 4/2012 | Hausdorff et al. |
| 2012/0119904 | A1 | 5/2012 | Boone et al. |
| 2012/0219180 | A1 | 8/2012 | Mehra |
| 2012/0304767 | A1 | 12/2012 | Howard et al. |
| 2013/0065569 | A1 | 3/2013 | Leipzig et al. |
| 2013/0091016 | A1 | 4/2013 | Shutter |
| 2013/0135097 | A1 | 5/2013 | Doezema |
| 2013/0343584 | A1* | 12/2013 | Bennett .................... A61J 1/00 381/317 |
| 2013/0343585 | A1 | 12/2013 | Bennett et al. |
| 2014/0002586 | A1 | 1/2014 | Nourbakhsh |
| 2014/0023216 | A1 | 1/2014 | Solum et al. |
| 2014/0024972 | A1 | 1/2014 | Greene |
| 2014/0031703 | A1 | 1/2014 | Rayner et al. |
| 2014/0046209 | A1 | 2/2014 | Klap et al. |
| 2014/0064528 | A1 | 3/2014 | Flood et al. |
| 2014/0074180 | A1 | 3/2014 | Heldman et al. |
| 2014/0145848 | A1 | 5/2014 | Amir |
| 2014/0148733 | A1 | 5/2014 | Stone et al. |
| 2014/0257051 | A1 | 9/2014 | Cam et al. |
| 2014/0266988 | A1 | 9/2014 | Fisher et al. |
| 2014/0276238 | A1 | 9/2014 | Osorio |
| 2014/0341408 | A1 | 11/2014 | Varghese et al. |
| 2015/0018724 | A1 | 1/2015 | Hsu et al. |
| 2015/0040685 | A1 | 2/2015 | Nicholson et al. |
| 2015/0112151 | A1 | 4/2015 | Muhsin et al. |
| 2015/0112162 | A1 | 4/2015 | Wilmink |
| 2015/0164383 | A1 | 6/2015 | Varsavsky et al. |
| 2015/0196231 | A1 | 7/2015 | Ziaie et al. |
| 2015/0209212 | A1 | 7/2015 | Duguid |
| 2015/0226621 | A1 | 8/2015 | Zhu et al. |
| 2015/0257662 | A1 | 9/2015 | Lee et al. |
| 2015/0269824 | A1 | 9/2015 | Zhang |
| 2015/0319546 | A1 | 11/2015 | Sprague |
| 2015/0351690 | A1 | 12/2015 | Toth et al. |
| 2016/0015289 | A1 | 1/2016 | Simon et al. |
| 2016/0029938 | A1 | 2/2016 | Shudo |
| 2016/0033280 | A1 | 2/2016 | Moore et al. |
| 2016/0057550 | A1 | 2/2016 | Shennib |
| 2016/0070122 | A1 | 3/2016 | Sales et al. |
| 2016/0100776 | A1 | 4/2016 | Najafi et al. |
| 2016/0106346 | A1 | 4/2016 | Benzel et al. |
| 2016/0155312 | A1 | 6/2016 | Osorio |
| 2016/0166190 | A1 | 6/2016 | Publicover et al. |
| 2016/0262608 | A1 | 9/2016 | Krueger |
| 2016/0263437 | A1 | 9/2016 | Kow et al. |

(56) References Cited

U.S. PATENT DOCUMENTS

| | | | |
|---|---|---|---|
| 2016/0275805 A1 | 9/2016 | Reichow | |
| 2016/0295978 A1 | 10/2016 | Hyde et al. | |
| 2017/0000387 A1 | 1/2017 | Forth et al. | |
| 2017/0006931 A1 | 1/2017 | Guez et al. | |
| 2017/0007147 A1 | 1/2017 | Hasegawa | |
| 2017/0055917 A1 | 3/2017 | Stone et al. | |
| 2017/0071532 A1 | 3/2017 | Greco | |
| 2017/0112671 A1 | 4/2017 | Goldstein | |
| 2017/0116846 A1 | 4/2017 | Wengrovitz et al. | |
| 2017/0127196 A1 | 5/2017 | Blum et al. | |
| 2017/0140637 A1 | 5/2017 | Thurlow et al. | |
| 2017/0156965 A1 | 6/2017 | Geisinger et al. | |
| 2017/0169716 A1 | 6/2017 | Super et al. | |
| 2017/0172465 A1 | 6/2017 | Osorio | |
| 2017/0188895 A1 | 7/2017 | Nathan | |
| 2017/0197115 A1 | 7/2017 | Cook et al. | |
| 2017/0229041 A1 | 8/2017 | Reichow et al. | |
| 2017/0273616 A1 | 9/2017 | Yang et al. | |
| 2017/0274219 A1 | 9/2017 | Ernst et al. | |
| 2017/0291065 A1 | 10/2017 | Klopman | |
| 2017/0352240 A1 | 12/2017 | Carlton-Foss | |
| 2017/0358195 A1 | 12/2017 | Bobda | |
| 2017/0358241 A1 | 12/2017 | Wexler et al. | |
| 2017/0360364 A1 | 12/2017 | Heasman et al. | |
| 2018/0000385 A1 | 1/2018 | Heaton et al. | |
| 2018/0092572 A1 | 4/2018 | Sanchez et al. | |
| 2018/0093121 A1 | 4/2018 | Matsuura et al. | |
| 2018/0110466 A1 | 4/2018 | Ralston | |
| 2018/0132757 A1 | 5/2018 | Kong et al. | |
| 2018/0177436 A1 | 6/2018 | Chang et al. | |
| 2018/0202813 A1 | 7/2018 | Belt et al. | |
| 2018/0228404 A1 | 8/2018 | Bhunia et al. | |
| 2018/0228405 A1* | 8/2018 | Burwinkle | G16H 40/60 |
| 2018/0233018 A1 | 8/2018 | Burwinkel et al. | |
| 2018/0233028 A1 | 8/2018 | Rhoads et al. | |
| 2018/0234781 A1 | 8/2018 | Stewart et al. | |
| 2018/0242859 A1 | 8/2018 | LeBoeuf et al. | |
| 2018/0250494 A1 | 9/2018 | Hanbury | |
| 2018/0279915 A1 | 10/2018 | Huang et al. | |
| 2018/0279919 A1 | 10/2018 | Bansbach et al. | |
| 2018/0289287 A1 | 10/2018 | Sio et al. | |
| 2018/0317837 A1 | 11/2018 | Burwinkel et al. | |
| 2018/0336773 A1 | 11/2018 | Hanson et al. | |
| 2018/0341582 A1 | 11/2018 | Moon et al. | |
| 2018/0343527 A1 | 11/2018 | Edwards | |
| 2019/0008435 A1 | 1/2019 | Cakmak | |
| 2019/0015046 A1 | 1/2019 | Whitehouse et al. | |
| 2019/0103007 A1* | 4/2019 | Tan | A61B 5/1123 |
| 2019/0117121 A1 | 4/2019 | Kutina et al. | |
| 2019/0246890 A1 | 8/2019 | Kerasidis et al. | |
| 2020/0138364 A1 | 5/2020 | Fabry et al. | |
| 2020/0143703 A1 | 5/2020 | Fabry et al. | |
| 2020/0205746 A1 | 7/2020 | Burwinkel et al. | |
| 2020/0219373 A1 | 7/2020 | Stut et al. | |
| 2020/0236479 A1 | 7/2020 | Burwinkel et al. | |
| 2020/0245869 A1 | 8/2020 | Sivan et al. | |
| 2020/0268260 A1 | 8/2020 | Tran | |
| 2020/0273566 A1 | 8/2020 | Bhowmik et al. | |
| 2022/0031195 A1 | 2/2022 | Hu et al. | |
| 2022/0248970 A1 | 8/2022 | Burwinkel et al. | |
| 2022/0361787 A1 | 11/2022 | Burwinkel et al. | |
| 2023/0397891 A1 | 12/2023 | Talebanpour et al. | |
| 2023/0404490 A1 | 12/2023 | Burwinkel et al. | |
| 2024/0000315 A1 | 1/2024 | Shahar et al. | |

FOREIGN PATENT DOCUMENTS

| | | |
|---|---|---|
| EP | 1628504 | 2/2006 |
| EP | 2104366 | 9/2009 |
| EP | 2700907 | 2/2014 |
| EP | 2725818 | 4/2014 |
| EP | 3075306 | 10/2016 |
| EP | 3131027 | 2/2017 |
| EP | 1983896 | 6/2017 |
| EP | 3246888 | 11/2017 |
| EP | 3328277 | 6/2018 |
| EP | 3346402 | 7/2018 |
| EP | 3402218 | 11/2018 |
| EP | 3591990 | 1/2020 |
| EP | 3669765 | 6/2020 |
| WO | 2008143908 | 11/2008 |
| WO | 2009053184 | 4/2009 |
| WO | 2010046504 | 4/2010 |
| WO | 2010049543 | 5/2010 |
| WO | 2010108287 | 9/2010 |
| WO | 2012083102 | 6/2012 |
| WO | 2015164456 | 10/2015 |
| WO | 2016088027 | 6/2016 |
| WO | 2016097746 | 6/2016 |
| WO | 2016110804 | 7/2016 |
| WO | 2016123129 | 8/2016 |
| WO | 2017023864 | 2/2017 |
| WO | 2018093765 | 5/2018 |
| WO | 2018127851 | 7/2018 |
| WO | 2018147942 | 8/2018 |
| WO | 2018147943 | 8/2018 |
| WO | 2018148713 | 8/2018 |
| WO | 2018223505 | 12/2018 |
| WO | 2019073473 | 4/2019 |
| WO | 2019086997 | 5/2019 |
| WO | 2020097353 | 5/2020 |
| WO | 2020097355 | 5/2020 |
| WO | 2020124022 | 6/2020 |
| WO | 2020139850 | 7/2020 |
| WO | 2020206155 | 10/2020 |
| WO | 2021016094 | 1/2021 |
| WO | 2022094089 | 5/2022 |
| WO | 2022103954 | 5/2022 |

OTHER PUBLICATIONS

"Communication Pursuant to Article 94(3) EPC," for European Patent Application No. 20754071.1 mailed Aug. 11, 2023 (5 pages).
"Final Office Action," for U.S. Appl. No. 15/858,680 mailed Jun. 21, 2023 (25 pages).
"Final Office Action," for U.S. Appl. No. 15/895,311 mailed May 8, 2023 (25 pages).
"International Preliminary Report on Patentability," for PCT Application No. PCT/US2020/042571 mailed Feb. 3, 2022 (14 pages).
"International Preliminary Report on Patentability," for PCT Application No. PCT/US2021/057064 mailed May 11, 2023 (11 pages).
"International Preliminary Report on Patentability," for PCT Application No. PCT/US2021/058971 mailed May 25, 2023 (12 pages).
"International Search Report and Written Opinion," for PCT Application No. PCT/US2020/042571 mailed Nov. 25, 2020 (20 pages).
"International Search Report and Written Opinion," for PCT Application No. PCT/US2021/058971 mailed Mar. 3, 2022 (17 pages).
"Invitation to Pay Additional Fees," for PCT Application No. PCT/US2020/042571 mailed Sep. 16, 2020 (15 pages).
"Non-Final Office Action," for U.S. Appl. No. 15/858,680 mailed Jan. 25, 2023 (23 pages).
"Non-Final Office Action," for U.S. Appl. No. 15/895,311 mailed Dec. 28, 2022 (21 pages).
"Notice of Allowance," for U.S. Appl. No. 16/725,766 mailed Dec. 23, 2022 (12 pages).
"Response to Final Office Action," for U.S. Appl. No. 15/858,680, filed Nov. 11, 2022 (10 pages).
"Response to Final Office Action," for U.S. Appl. No. 15/895,311, filed Jul. 28, 2023 (16 pages).
"Response to Final Office Action," for U.S. Appl. No. 15/895,311, filed Oct. 18, 2022 (10 pages).
"Response to Non-Final Office Action," for U.S. Appl. No. 15/858,680, filed Apr. 20, 2023 (12 pages).
"Response to Non-Final Office Action," for U.S. Appl. No. 15/895,311, filed Mar. 20, 2023 (15 pages).
"Response to Non-Final Office Action," for U.S. Appl. No. 16/725,766, filed Sep. 23, 2022 (9 pages).
"Understanding Heart Disease," WebMD Heart Disease Guide Written by WebMD Editorial Contributors and medically reviewed

(56) References Cited

OTHER PUBLICATIONS by James Beckerman, published at https://www.webmd.com/heart-disease/understanding-heart-disease-symptoms at least as early as Mar. 2007 (10 pages).
Raj, Rahul, et al."Factors correlating with delayed trauma center admission following traumatic brain injury," Scandinavian Journal of Trauma, Resuscitation and Emergency Medicine 2013, 21:67 (9 pages).
Tinetti, Mary E., et al." Antihypertensive Medications and Serious Fall Injuries in a Nationally Representative Sample of Older Adults," JAMA Intern. Med. Apr. 2014; 174(4): 588-595 (16 pages).
"Communication Pursuant to Article 94(3) EPC," for European Patent Application No. 17838110.9 mailed Feb. 1, 2022 (8 pages).
"European Search Report," for European Patent Application No. 19212657.1 mailed Feb. 14, 2020 (10 pages).
File History for U.S. Appl. No. 16/714,339 downloaded Mar. 11, 2022 (334 pages).
File History for U.S. Appl. No. 15/895,311 downloaded Mar. 11, 2022 (323 pages).
File History for U.S. Appl. No. 15/858,630 downloaded Mar. 14, 2022 (274 pages).
File History for U.S. Appl. No. 15/858,680 downloaded Mar. 11, 2022 (345 pages).
File History for U.S. Appl. No. 16/725,766 downloaded Mar. 11, 2022 (187 pages).
"International Preliminary Report on Patentability," for PCT Application No. PCT/US2017/069026 mailed Aug. 22, 2019 (9 pages).
"International Preliminary Report on Patentability," for PCT Application No. PCT/US2017/0690365 mailed Aug. 22, 2019 (9 pages).
"International Preliminary Report on Patentability," for PCT Application No. PCT/US2018/017944 mailed Aug. 22, 2019 (7 pages).
"International Preliminary Report on Patentability," for PCT Application No. PCT/US2019/066358 mailed Jun. 24, 2021 (12 pages).
"International Preliminary Report on Patentability," for PCT Application No. PCT/US2019/068397 mailed Jul. 8, 2021 (9 pages).
"International Preliminary Report on Patentability," for PCT Application No. PCT/US2020/026435 mailed Oct. 14, 2021 (8 pages).
"International Search Report and Written Opinion," for PCT Application No. PCT/US2017/069026 mailed Apr. 3, 2018 (16 pages).
"International Search Report and Written Opinion," for PCT Application No. PCT/US2017/069035 mailed Apr. 3, 2018 (16 pages).
"International Search Report and Written Opinion," for PCT Application No. PCT/US2018/017944 mailed Apr. 26, 2018 (12 pages).
"International Search Report and Written Opinion," for PCT Application No. PCT/US2019/060296 mailed Apr. 14, 2020 (14 pages).
"International Search Report and Written Opinion," for PCT Application No. PCT/US2019/060298 mailed Apr. 28, 2020 (20 pages).
"International Search Report and Written Opinion," for PCT Application No. PCT/US2019/066358 mailed Jun. 23, 2020 (18 pages).
"International Search Report and Written Opinion," for PCT Application No. PCT/US2019/068397 mailed Apr. 14, 2020 (14 pages).
"International Search Report and Written Opinion," for PCT Application No. PCT/US2020/026435 mailed Jul. 9, 2020 (12 pages).
"Invitation to Pay Additional Fees and, Where Applicable, Protest Fee," for PCT Application No. PCT/US2019/066358 mailed Mar. 5, 2020 (12 pages).
EP Search Report dated Oct. 8, 2018 from EP App. No. 18171323.1, 10 pages.
"Non Final Office Action," for U.S. Appl. No. 15/589,298 mailed Jan. 2, 2019 (8 pages).
"Non-Final Office Action," for U.S. Appl. No. 15/589,298 mailed Jul. 11, 2019 (13 pages).
"Non-Final Office Action," for U.S. Appl. No. 15/589,298 mailed May 19, 2020 (15 pages).
"Notice of Allowance," for U.S. Appl. No. 15/589,298 mailed Jan. 22, 2020 (12 pages).
"Response to Non Final Office Action," for U.S. Appl. No. 15/589,298, filed with the USPTO Apr. 1, 2019 (8 pages).
"Response to Non-Final Office Action," for U.S. Appl. No. 15/589,298, filed Aug. 19, 2020 (14 pages).
"Response to Non-Final Office Action," for U.S. Appl. No. 15/589,298, filed Oct. 3, 2019 (12 pages).
PathVU Mobile App, Pathway Accessibility Solutions, Inc., Pittsburgh, Pennsylvania [retrieved on Jun. 19, 2018. Retrieved from the Internet :<URL: http://www.pathvu.com/>; 6 pgs.
Barber & Stockwell "Manual of Electronystagmography," 1980, C.V. Mosby Company, St. Louis, Missouri, Cover page, copyright page, and table of contents; total of 3 pages.
Buatois, et al."Posturography and Risk of Recurrent Falls in Healthy Non-Institutionalized Persons Aged Over 65," Gerontology, 2006; 52(6):345-352 (8 pages).
Choi, W. J., et al."Effect of Neck Flexor Muscle Activation on Impact Velocity of the Head During Backward Falls in Young Adults," Clinical Biomechanics 49 (2017), pp. 28-33.
Coburn, Courtney, et al."The Comfort Bud: Designed with Patients in Mind," Starkey Hearing Technologies Product Sheet, 2017 (2 pages).
Da Costa, et al."Can Falls Risk Prediction Tools Correctly Identify Fall-Prone Elderly Rehabilitation Inpatients? A Systematic Review and Meta-Analysis," PLoS ONE, 2012; 7(7):e41061 (8 pages).
El Miedany, et al."Falls Risk Assessment Score (FRAS): Time to Rethink, " Journal of Clinical Gerontology & Geriatrics, 2011: 2011; 2(1):21-26 (6 pages).
Farrell, Lisa, et al. "Vestibular Rehabilitation: An Effective, Evidence-Based Treatment," Vestibular Disorders Association 2015 (11 pages).
Hendrich, Ann L., et al."Validation of the Hendrich II Fall Risk Model: A Large Concurrent Case/Control Study of Hospitalized Patients," Applied Nursing Research, vol. 16, No. 1 (February), 2003: pp. 9-21 (13 pages).
Hendrich, Ann, et al."Hospital Falls: Development of a Predictive Model for Clinical Practice," Applied Nursing Research, vol. 8, No. 3 (August), 1995: pp. 129-139 (11 pages).
Horak "Postural Orientation and Equilibrium: What do we Need to Know About Neural Control of Balance to Prevent Falls?," Age and Ageing, 2006; 35-S2:ii7-ii11 (5 pages).
Howcroft, et al."Review of Fall Risk Assessment in Geriatric Populations using Inertial Sensors," J Neuroeng Rehab, 2013; 10:91 (12 pages).
Howcroft, et al."Understanding Dynamic Stability From Pelvis Accelerometer Data and the Relationship to Balance and Mobility in Transtibial Amputees," Gait Posture, 2015; 41(3): 808-812 (5 pages).
Klenk, et al."Conceptualizing a Dynamic Fall Risk Model Including Intrinsic Risks and Exposures," JAMDA, 2017; 18:921-927 (7 pages).
Leake, Jason Llewellyn"Fall Detectors for People with Dementia," University of Bath Student Thesis, Jun. 2016 (364 pages).
Marschollek, et al. "Predicting In-Patient Falls in a Geriatric Clinic: a Clinical Study Combining Assessment Data and Simple Sensory Gait Measurements," Z Gerontol Geriatr, 2009; 42(4):317-321 (6 pages).
Oliver "Falls Risk-Prediction Tools for Hospital Inpatients. Time to Put Them to Bed?," Age and Ageing, 2008; 37:248-250 (3 pages).
Rumalla, et al."The Effect of Hearing Aids on Postural Stability," Laryngoscope, 2015; 125(3):720-723 (4 pages).
Salisbury, Joseph P., et al. "Patient Engagement Platform for Remote Monitoring of Vestibular Rehabilitation with Applications in Concussion Management and Elderly Fall Prevention," 2018 IEEE International Conference on Healthcare Informatics, pp. 422-423.
Viikki "Machine Learning on Otoneurological Data: Decision Trees for Vertigo Diseases," Academic Dissertation, University of Tampere, Finland, 2002; 84 pages.
Yang, et al. "Fall Risk Assessment and Early-Warning for Toddler Behaviors at Home," Sensors, 2013; 13:16985-17005 (21 pages).
Zheng, et al. "Effect of postural changes on lower limb blood vol. detected with non-invasive photoplethysmography," Journal of Medical Engineering & Technology, vol. 32, No. 5, Sep./Oct. 2008, pp. 358-364 (7 pages).
"Final Office Action," for U.S. Appl. No. 15/858,680 mailed Aug. 12, 2022 (19 pages).
"Final Office Action," for U.S. Appl. No. 15/895,311 mailed Jul. 18, 2022 (15 pages).

(56) References Cited

OTHER PUBLICATIONS

"International Search Report and Written Opinion," for PCT Application No. PCT/US2021/057064 mailed Feb. 10, 2022 (15 pages).
"Non-Final Office Action," for U.S. Appl. No. 15/858,680 mailed Apr. 8, 2022 (22 pages).
"Non-Final Office Action," for U.S. Appl. No. 16/725,766 mailed Jun. 24, 2022 (16 pages).
"Response to Final Office Action," for U.S. Appl. No. 16/725,766, filed Jun. 7, 2022 (8 pages).
"Response to Non-Final Office Action," for U.S. Appl. No. 15/858,680, filed Jul. 8, 2022 (10 pages).
"Response to Non-Final Office Action," for U.S. Appl. No. 15/895,311, filed Jun. 9, 2022 (9 pages).
Wen, Jiaqu, et al. "We Help You Watch Your Steps: Unobtrusive Alertness System for Pedestrian Mobile Phone Users," 2015, IEEE International Conference on Pervasive Computing and Communications (PerCom), pp. 105-113 (9 pages).
"Non-Final Office Action," for U.S. Appl. No. 15/858,680 mailed Dec. 18, 2023 (32 pages).
"Non-Final Office Action," for U.S. Appl. No. 15/895,311 mailed Oct. 12, 2023 (13 pages).
"Response to Final Office Action," for U.S. Appl. No. 15/858,680, filed Sep. 21, 2023 (14 pages).
Corvera, Jorge, et al. "Evaluation of the Vestibular Autorotation Test (VAT) for Measuring Vestibular Oculomotor Reflex in Clinical Research," Archives of Medical Research 31 (2000), 384-387 (4 pages).
"Final Office Action," for U.S. Appl. No. 15/858,680 mailed May 6, 2024 (25 pages).
"Final Office Action," for U.S. Appl. No. 15/895,311 mailed Mar. 12, 2024 (15 pages).
"Non-Final Office Action," for U.S. Appl. No. 17/600,370 mailed Feb. 28, 2024 (43 pages).
"Non-Final Office Action," for U.S. Appl. No. 18/139,671 mailed Apr. 11, 2024 (42 pages).
"Response to Non-Final Office Action," for U.S. Appl. No. 15/895,311, filed Jan. 12, 2024 (9 pages).
"Response to Non-Final Rejection," mailed on Dec. 18, 2023, for U.S. Appl. No. 15/858,680, submitted via EFS-Web on Mar. 18, 2024, (12 pages).

* cited by examiner

HEARING ASSISTANCE SYSTEM WITH ENHANCED FALL DETECTION FEATURES

This application is a continuation of U.S. application Ser. No. 16/714,339, filed Dec. 13, 2019, which claims the benefit of U.S. Provisional Application Nos. 62/780,223, filed Dec. 15, 2018, and 62/944,225, filed Dec. 5, 2019, the contents of all of which are herein incorporated by reference in their entireties.

FIELD

Embodiments herein relate to devices and related systems and methods for detecting falls.

BACKGROUND

Falls are the second leading cause of accidental or unintentional injury deaths worldwide and are especially prevalent in the elderly. In many cases, individuals who have fallen may need assistance in getting up and/or may need to notify someone else of their fall. However, many people are somewhat disoriented after they have fallen making communication more difficult. In addition, typical means of contacting someone else for assistance or notification purposes, such as placing a telephone call, may be hard to execute for someone who has fallen.

SUMMARY

Embodiments herein relate to devices and related systems and methods for detecting falls. In a first aspect, a hearing assistance device is included having a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, and a first power supply circuit in electrical communication with the first control circuit. The first control circuit is configured to evaluate data from one or more sensors to detect a possible fall of a subject in physical contact with the hearing assistance device, wirelessly transmit data regarding a possible fall to another device including an indication of whether the possible fall was detected binaurally or monoaurally.

In a second aspect, in addition to one or more of the preceding or following aspects, or in the alternative to some aspects, the first control circuit is further configured to initiate a timer if a possible fall of the subject is detected, and initiate issuance of a fall alert if the timer reaches a threshold value.

In a third aspect, in addition to one or more of the preceding or following aspects, or in the alternative to some aspects, the first control circuit is further configured to monitor for a cancellation command from the subject to cancel the timer, and initiate issuance of a fall alert if the timer reaches a threshold value and a cancellation command has not been detected.

In a fourth aspect, in addition to one or more of the preceding or following aspects, or in the alternative to some aspects, the data including one or more of motion sensor data, physiological data regarding the subject, and environmental data relative to a location of the subject.

In a fifth aspect, in addition to one or more of the preceding or following aspects, or in the alternative to some aspects, the physiological data regarding the subject can include one or more of heart rate data, blood pressure data, core temperature data, electromyography (EMG) data, electrooculography (EOG) data, and electroencephalogram (EEG) data.

In a sixth aspect, in addition to one or more of the preceding or following aspects, or in the alternative to some aspects, the environmental data relative to the location of the subject can include one or more of location services data, magnetometer data, ambient temperature, and contextual data.

In a seventh aspect, in addition to one or more of the preceding or following aspects, or in the alternative to some aspects, the hearing assistance device is configured to evaluate data from one or more sensors to detect a possible fall of a subject in physical contact with the hearing assistance device by evaluating at least one of timing of steps and fall detection phases, degree of acceleration changes, activity classification, and posture changes.

In an eighth aspect, in addition to one or more of the preceding or following aspects, or in the alternative to some aspects, the hearing assistance device is configured to evaluate data from one or more sensors to detect a possible fall of a subject in physical contact with the hearing assistance device by evaluating at least one of vertical acceleration, estimated velocity, acceleration duration, estimated falling distance, posture changes, and impact magnitudes.

In a ninth aspect, in addition to one or more of the preceding or following aspects, or in the alternative to some aspects, the timer is a count-down timer and the threshold value is zero seconds.

In a tenth aspect, in addition to one or more of the preceding or following aspects, or in the alternative to some aspects, the timer is a count-up timer and the threshold value is from 5 to 600 seconds.

In an eleventh aspect, in addition to one or more of the preceding or following aspects, or in the alternative to some aspects, the cancellation command can include at least one of a button press, a touch screen contact, a predetermined gesture, and a voice command.

In a twelfth aspect, in addition to one or more of the preceding or following aspects, or in the alternative to some aspects, the fall alert includes an electronic communication.

In a thirteenth aspect, in addition to one or more of the preceding or following aspects, or in the alternative to some aspects, the fall alert includes at least one of a telephonic call, a text message, an email, and an application notification.

In a fourteenth aspect, in addition to one or more of the preceding or following aspects, or in the alternative to some aspects, the hearing assistance device is further configured to save data including at least one of motion sensor data, processed motion sensor data, motion feature data, detection state data, physiological data regarding the subject, and environmental data relative to a location of the subject and transmit the data wirelessly.

In a fifteenth aspect, in addition to one or more of the preceding or following aspects, or in the alternative to some aspects, the hearing assistance device is configured to detect a possible fall of the subject only when a threshold amount of time has passed since the hearing assistance device has been powered on, placed on or in an ear, or otherwise activated.

In a sixteenth aspect, in addition to one or more of the preceding or following aspects, or in the alternative to some aspects, the hearing assistance device is configured to detect a possible fall of the subject only when the hearing assistance device is being worn by the subject.

In a seventeenth aspect, a hearing assistance device is included having a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, and a first power supply circuit in electrical communication with the first control circuit. The first control circuit is configured to evaluate data from one or more sensors to detect a possible fall of a subject in physical contact with the hearing assistance device, initiate issuance of a fall alert if a possible fall of the subject is detected, begin a timer if a possible fall of the subject is detected, monitor for a cancellation command from the subject, and cancel the issued fall alert if a cancellation command is detected and the timer has not yet reached a threshold value.

In an eighteenth aspect, a hearing assistance system is included having a hearing assistance device can include a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, a first power supply circuit in electrical communication with the first control circuit, and an accessory device in electronic communication with the hearing assistance device. At least one of the hearing assistance device and the accessory device is configured to evaluate data from one or more sensors to detect a possible fall of a subject in physical contact with the hearing assistance device, initiate a timer if a possible fall of the subject is detected, monitor for a cancellation command from the subject to cancel the timer, and initiate issuance of a fall alert if the timer reaches a threshold value and a cancellation command has not been detected.

In a nineteenth aspect, in addition to one or more of the preceding or following aspects, or in the alternative to some aspects, the accessory device can include at least one selected from the group consisting of a smart phone, cellular telephone, personal digital assistant, personal computer, streaming device, wide area network device, personal area network device, remote microphone, smart watch, home monitoring device, internet gateway, hearing aid accessory, TV streamer, wireless audio streaming device, landline streamer, remote control, Direct Audio Input (DAI) gateway, audio gateway, telecoil receiver, hearing device programmer, charger, drying box, smart glasses, a captioning device, a wearable or implantable health monitor.

In a twentieth aspect, a hearing assistance system is included having a hearing assistance device including a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, a first power supply circuit in electrical communication with the first control circuit, and an accessory device in electronic communication with the hearing assistance device. At least one of the hearing assistance device and the accessory device is configured to evaluate data from one or more sensors to detect a possible fall of a subject in physical contact with the hearing assistance device, initiate issuance of a fall alert if a possible fall of the subject is detected, begin a timer if a possible fall of the subject is detected, monitor for a cancellation command from the subject, and cancel the issued fall alert if a cancellation command is detected and the timer has not yet reached a threshold value.

In a twenty-first aspect, in addition to one or more of the preceding or following aspects, or in the alternative to some aspects, the accessory device can include at least one selected from the group consisting of a smart phone, cellular telephone, personal digital assistant, personal computer, streaming device, wide area network device, personal area network device, remote microphone, smart watch, home monitoring device, internet gateway, hearing aid accessory, TV streamer, wireless audio streaming device, landline streamer, remote control, Direct Audio Input (DAI) gateway, audio gateway, telecoil receiver, hearing device programmer, charger, drying box, smart glasses, a captioning device, a wearable or implantable health monitor.

In a twenty-second aspect, a method of detecting a possible fall of a subject is included, the method including evaluating at least one of timing of steps and fall detection phases, degree of acceleration changes, activity classification, and posture changes of the subject, as derived from data obtained from sensors associated with a hearing assistance device in physical contact with the subject, initiating a timer if a possible fall of the subject is detected, monitoring for a cancellation command from the subject to cancel the timer, and initiating a fall alert action if the timer reaches a threshold value and a cancellation command has not been detected, the fall alert action can include at least one of: initiating issuance of a fall alert, and not initiating cancellation of a previously issued fall alert.

In a twenty-third aspect, a hearing assistance device is included having a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, and a first power supply circuit in electrical communication with the first control circuit. The first control circuit is configured to evaluate data from one or more sensors to detect a possible fall of a subject in physical contact with the hearing assistance device, send a notification of the possible fall to at least one of a second hearing assistance device and an accessory device, monitor for a notification of the possible fall transmitted from at least one of the second hearing assistance device and the accessory device, and issue a fall alert if a notification of the possible fall is received from at least one of the second hearing assistance device and the accessory device.

In a twenty-fourth aspect, in addition to one or more of the preceding or following aspects, or in the alternative to some aspects, the first control circuit is further configured to issue a fall alert even if a notification of the possible fall is not received from at least one of the second hearing assistance device and the accessory device if communication has been lost with the respective device.

In a twenty-fifth aspect, in addition to one or more of the preceding or following aspects, or in the alternative to some aspects, the first control circuit is further configured to issue a fall alert even if a notification of the possible fall is not received from at least one of the second hearing assistance device and the accessory device if a near field communication channel between the hearing assistance device and a second hearing assistance device is inoperative.

In a twenty-sixth aspect, in addition to one or more of the preceding or following aspects, or in the alternative to some aspects, the first control circuit is further configured to issue a fall alert even if a notification of the possible fall is not received from at least one of the second hearing assistance device and the accessory device if a near-field magnetic induction communication channel between the hearing assistance device and a second hearing assistance device is inoperative.

In a twenty-seventh aspect, in addition to one or more of the preceding or following aspects, or in the alternative to some aspects, the first control circuit is further configured to issue a fall alert even if a notification of the possible fall is not received from the second hearing assistance device if the hearing assistance device is not presently in communication with a second hearing assistance device.

In a twenty-eighth aspect, in addition to one or more of the preceding or following aspects, or in the alternative to some aspects, monitoring for a notification includes polling at least one of the second hearing assistance device and the accessory device.

In a twenty-ninth aspect, in addition to one or more of the preceding or following aspects, or in the alternative to some aspects, the data from one or more sensors including one or more of motion sensor data, physiological data regarding the subject, and environmental data relative to a location of the subject.

In a thirtieth aspect, in addition to one or more of the preceding or following aspects, or in the alternative to some aspects, the physiological data regarding the subject can include one or more of heart rate data, blood pressure data, core temperature data, electromyography (EMG) data, electrooculography (EOG) data, and electroencephalogram (EEG) data.

In a thirty-first aspect, in addition to one or more of the preceding or following aspects, or in the alternative to some aspects, the environmental data relative to the location of the subject can include one or more of location services data, ambient temperature, and contextual data.

In a thirty-second aspect, in addition to one or more of the preceding or following aspects, or in the alternative to some aspects, the hearing assistance device is configured to evaluate data from one or more sensors to detect a possible fall of a subject in physical contact with the hearing assistance device by evaluating at least one of timing of steps and fall detection phases, degree of acceleration changes, activity classification, and posture changes.

In a thirty-third aspect, a hearing assistance system can include a first hearing assistance device can include a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, a first power supply circuit in electrical communication with the first control circuit, a second hearing assistance device can include a second control circuit, a second motion sensor in electrical communication with the second control circuit, wherein the second motion sensor is disposed in a fixed position relative to a head of a subject wearing the hearing assistance device, a second microphone in electrical communication with the second control circuit, a second transducer for generating sound in electrical communication with the first control circuit, a second power supply circuit in electrical communication with the second control circuit, wherein the first control circuit is configured to evaluate data from one or more sensors to detect a possible fall of a subject in physical contact with the first hearing assistance device, send a notification of the possible fall to the second hearing assistance device, monitor for a notification of the possible fall from the second hearing assistance device, and send a fall alert to an accessory device if a notification of the possible fall is received from the second hearing assistance device, and wherein the second control circuit is configured to evaluate data from one or more sensors to detect a possible fall of a subject in physical contact with the second hearing assistance device, send a notification of the possible fall to the first hearing assistance device, monitor for a notification of the possible fall from the first hearing assistance device, and send a fall alert to an accessory device if a notification of the possible fall is received from the first hearing assistance device.

In a thirty-fourth aspect, in addition to one or more of the preceding or following aspects, or in the alternative to some aspects, the accessory device can include at least one selected from the group consisting of a smart phone, cellular telephone, personal digital assistant, personal computer, streaming device, wide area network device, personal area network device, remote microphone, smart watch, home monitoring device, internet gateway, hearing aid accessory, TV streamer, wireless audio streaming device, landline streamer, remote control, Direct Audio Input (DAI) gateway, audio gateway, telecoil receiver, hearing device programmer, charger, drying box, smart glasses, a captioning device, a wearable or implantable health monitor.

In a thirty-fifth aspect, a hearing assistance system can include a first hearing assistance device can include a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, a first power supply circuit in electrical communication with the first control circuit, a second hearing assistance device can include a second control circuit, a second motion sensor in electrical communication with the second control circuit, wherein the second motion sensor is disposed in a fixed position relative to a head of a subject wearing the hearing assistance device, a second microphone in electrical communication with the second control circuit, a second transducer for generating sound in electrical communication with the first control circuit, a second power supply circuit in electrical communication with the second control circuit, wherein the hearing assistance system is configured to receive data from both the first hearing assistance device and the second hearing assistance device at a first location, evaluate whether the data from the first hearing assistance device and the second hearing assistance device is congruent with one another at the first location, evaluate data from at least one of the first hearing assistance device and the second hearing assistance device at the first location to detect a signature indicating a possible fall if the data from the first hearing assistance device and the second hearing assistance device is congruent with one another, and send a fall alert from at least one of the first hearing assistance device and the second hearing assistance device if a possible fall is detected.

In a thirty-sixth aspect, in addition to one or more of the preceding or following aspects, or in the alternative to some aspects, the hearing assistance system is configured to send a fall alert from both the first hearing assistance device and the second hearing assistance device if a possible fall is detected.

In a thirty-seventh aspect, in addition to one or more of the preceding or following aspects, or in the alternative to some aspects, the first location is the first hearing assistance device, the second hearing assistance device, or an accessory device.

In a thirty-eighth aspect, in addition to one or more of the preceding or following aspects, or in the alternative to some aspects, the data is deemed incongruent with one another if a spatial position of the first hearing assistance device as assessed with data from the first motion sensor with respect to a spatial position of the second hearing assistance device as assessed with data from the second motion sensor indicates that at least one of the first and second hearing assistance device is not being worn by the subject.

In a thirty-ninth aspect, in addition to one or more of the preceding or following aspects, or in the alternative to some aspects, the data is deemed incongruent with one another if movement of the first hearing assistance device as assessed with data from the first motion sensor with respect to movement of the second hearing assistance device as assessed with data from the second motion sensor indicates that at least one of the first and second hearing assistance device is not being worn by the subject.

In a fortieth aspect, in addition to one or more of the preceding or following aspects, or in the alternative to some aspects, the data is deemed incongruent with one another if a temperature of the first hearing assistance device with respect to a temperature of the second hearing assistance device indicates that at least one of the first and second hearing assistance device is not being worn by the subject.

In a forty-first aspect, in addition to one or more of the preceding or following aspects, or in the alternative to some aspects, the data is deemed incongruent with one another if physiological data gathered by at least one of the first hearing assistance device or the second hearing assistance device indicates that it is not being worn by the subject.

In a forty-second aspect, a first hearing assistance device is included having a first control circuit, a first motion sensor in electrical communication with the first control circuit, wherein the first motion sensor is disposed in a fixed position relative to a head of a subject wearing the first hearing assistance device, a first microphone in electrical communication with the first control circuit, a first transducer for generating sound in electrical communication with the first control circuit, a first power supply circuit in electrical communication with the first control circuit, wherein the first control circuit is configured to evaluate data from one or more sensors to detect a possible fall of a subject in physical contact with the first hearing assistance device, wirelessly send data to a second hearing assistance device regarding a detected possible fall, and wirelessly send data to an accessory device regarding a detected possible fall and whether the possible fall was detected by only the first hearing assistance device or by both the first hearing assistance device and the second hearing assistance device.

In a forty-third aspect, in addition to one or more of the preceding or following aspects, or in the alternative to some aspects, the data sent to the second hearing assistance device regarding a detected possible fall includes a command to initiate sensing, change sensing, or store sensor data.

In a forty-fourth aspect, in addition to one or more of the preceding or following aspects, or in the alternative to some aspects, the data sent to the second hearing assistance device regarding a detected possible fall includes fall detection data, the fall detection data including one or more of raw sensor data, processed sensor data, physiological data, environmental data relative to a location of the subject, alerts, warnings, commands, signals, clock data, and communication protocol elements.

In a forty-fifth aspect, a method of detecting a possible fall of a subject is included, the method evaluating at least one of timing of steps and fall detection phases, degree of acceleration changes, activity classification, and posture changes of the subject, as derived from data obtained from sensors associated with a first hearing assistance device in physical contact with the subject, wirelessly sending data from the first hearing assistance device to a second hearing assistance device regarding a detected possible fall, and wirelessly sending data from the first hearing assistance device to an accessory device regarding a detected possible fall and whether the possible fall was detected by only the first hearing assistance device or by both the first hearing assistance device and the second hearing assistance device.

In a forty-sixth aspect, a hearing assistance system is included having a hearing assistance device can include a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, a first power supply circuit in electrical communication with the first control circuit, an accessory device in electronic communication with the hearing assistance device, wherein the hearing assistance device is configured to: evaluate data from one or more sensors to detect a possible fall of a subject in physical contact with the hearing assistance device using a threshold-based detection technique, and transmit sensor data and/or features of the same to an accessory device, wherein the accessory device is configured to: evaluate data from one or more sensors and/or features of the same to detect a possible fall of a subject in physical contact with the hearing assistance device using a pattern-based or machine-learning based detection technique.

In a forty-seventh aspect, in addition to one or more of the preceding or following aspects, or in the alternative to some aspects, the hearing assistance system is further configured to initiate a timer if a possible fall of the subject is detected at both the hearing assistance device and the accessory device, monitor for a cancellation command from the subject to cancel the timer, and initiate issuance of a fall alert if the timer reaches a threshold value and a cancellation command has not been detected.

In a forty-eighth aspect, a hearing assistance system is included having a hearing assistance device can include a first control circuit, a first motion sensor in electrical communication with the first control circuit, the first motion sensor is disposed in a fixed position relative to a head of a subject wearing the hearing assistance device, a first microphone in electrical communication with the first control circuit, a first transducer for generating sound in electrical communication with the first control circuit, a first power supply circuit in electrical communication with the first control circuit, an accessory device in electronic communication with the hearing assistance device, wherein at least one of the hearing assistance device and the accessory device is configured to evaluate data in phases to detect a possible fall of a subject in physical contact with the hearing assistance device, the phases including pre-fall monitoring, falling phase detection, impact detection, and post-fall monitoring.

In a forty-ninth aspect, in addition to one or more of the preceding or following aspects, or in the alternative to some aspects, pre-fall monitoring includes tracking total acceleration signal (SV_tot) peaks and comparing them against a threshold value.

In a fiftieth aspect, in addition to one or more of the preceding or following aspects, or in the alternative to some aspects, falling phase detection includes tracking vertical acceleration, estimating vertical velocity, comparing fall duration against a threshold, comparing minimum total acceleration signal (SV_tot) against a threshold, comparing vertical velocity against a threshold, and monitoring posture change.

In a fifty-first aspect, in addition to one or more of the preceding or following aspects, or in the alternative to some aspects, impact detection includes evaluating a width and an amplitude of the vertical acceleration peaks against threshold values, evaluating total acceleration signal (SV_tot) amplitude against thresholds based on pre-fall peaks, and monitoring posture change, within a time window after the falling phase.

In a fifty-second aspect, in addition to one or more of the preceding or following aspects, or in the alternative to some aspects, post-fall monitoring includes posture detection based on an estimated direction of gravity and activity level detection.

In a fifty-third aspect, a hearing assistance system is included having a hearing assistance device can include a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, a first power supply circuit in electrical communication with the first control circuit, wherein the first control circuit is configured to evaluate data from one or more sensors to detect a possible fall of a subject in physical contact with the hearing assistance device, wirelessly transmit data regarding a possible fall to another device including an indication of whether the possible fall was detected binaurally or monoaurally.

In a fifty-fourth aspect, in addition to one or more of the preceding or following aspects, or in the alternative to some aspects, the first control circuit is further configured to initiate a timer if a possible fall of the subject is detected, and initiate issuance of a fall alert if the timer reaches a threshold value.

In a fifty-fifth aspect, in addition to one or more of the preceding or following aspects, or in the alternative to some aspects, the first control circuit further configured to monitor for a cancellation command from the subject to cancel the timer, and initiate issuance of a fall alert if the timer reaches a threshold value and a cancellation command has not been detected.

In a fifty-sixth aspect, in addition to one or more of the preceding or following aspects, or in the alternative to some aspects, the hearing assistance system is configured to evaluate data from one or more sensors to detect a possible fall of a subject in physical contact with the hearing assistance device by evaluating at least one of timing of steps and fall detection phases, degree of acceleration changes, direction of acceleration change, activity classification, and posture changes.

In a fifty-seventh aspect, in addition to one or more of the preceding or following aspects, or in the alternative to some aspects, the hearing assistance system is configured to evaluate data from one or more sensors to detect a possible fall of a subject in physical contact with the hearing assistance device by evaluating at least one of vertical acceleration, estimated velocity, acceleration duration, estimated falling distance, posture changes, and impact magnitudes.

In a fifty-eighth aspect, in addition to one or more of the preceding or following aspects, or in the alternative to some aspects, the hearing assistance system is configured to detect a possible fall of the subject only when a threshold amount of time has passed since the hearing assistance device has been powered on, placed on or in an ear, or otherwise activated.

In a fifty-ninth aspect, in addition to one or more of the preceding or following aspects, or in the alternative to some aspects, the hearing assistance system is configured to detect a possible fall of the subject only when the hearing assistance device is being worn by the subject.

In a sixtieth aspect, in addition to one or more of the preceding or following aspects, or in the alternative to some aspects, further can include an accessory device in electronic communication with the hearing assistance device, wherein at least one of the hearing assistance device and the accessory device is configured to: initiate issuance of a fall alert if a possible fall of the subject is detected, begin a timer if a possible fall of the subject is detected, monitor for a cancellation command from the subject, and cancel the issued fall alert if a cancellation command is detected and the timer has not yet reached a threshold value.

In a sixty-first aspect, in addition to one or more of the preceding or following aspects, or in the alternative to some aspects, can include a second hearing assistance device can include a second control circuit, a second motion sensor in electrical communication with the second control circuit, wherein the second motion sensor is disposed in a fixed position relative to a head of a subject wearing the hearing assistance device, a second power supply circuit in electrical communication with the second control circuit, wherein the hearing assistance system is configured to receive data from both the first hearing assistance device and the second hearing assistance device at a first location, evaluate whether the data from the first hearing assistance device and the second hearing assistance device is congruent with one another at the first location, evaluate data from at least one of the first hearing assistance device and the second hearing assistance device at the first location to detect a signature indicating a possible fall if the data from the first hearing assistance device and the second hearing assistance device is congruent with one another, and send a fall alert from at least one of the first hearing assistance device and the second hearing assistance device if a possible fall is detected.

In a sixty-second aspect, in addition to one or more of the preceding or following aspects, or in the alternative to some aspects, the data is deemed incongruent with one another if a spatial position of the first hearing assistance device as assessed with data from the first motion sensor with respect to a spatial position of the second hearing assistance device as assessed with data from the second motion sensor indicates that at least one of the first and second hearing assistance device is not being worn by the subject.

In a sixty-third aspect, in addition to one or more of the preceding or following aspects, or in the alternative to some aspects, the data is deemed incongruent with one another if movement of the first hearing assistance device as assessed with data from the first motion sensor with respect to movement of the second hearing assistance device as assessed with data from the second motion sensor indicates that at least one of the first and second hearing assistance device is not being worn by the subject.

In a sixty-fourth aspect, in addition to one or more of the preceding or following aspects, or in the alternative to some aspects, the data is deemed incongruent with one another if a temperature of the first hearing assistance device with respect to a temperature of the second hearing assistance device indicates that at least one of the first and second hearing assistance device is not being worn by the subject.

In a sixty-fifth aspect, in addition to one or more of the preceding or following aspects, or in the alternative to some aspects, the data is deemed incongruent with one another if physiological data gathered by at least one of the first hearing assistance device or the second hearing assistance device indicates that it is not being worn by the subject.

In a sixty-sixth aspect, in addition to one or more of the preceding or following aspects, or in the alternative to some aspects, the data is deemed incongruent with one another if the timing of features in the data does not match.

In a sixty-seventh aspect, a method of detecting a possible fall of a subject is included, the method including evaluating at least one of timing of steps and fall detection phases, degree of acceleration changes, direction of acceleration change, activity classification, and posture changes of the subject, as derived from data obtained from sensors associated with a first hearing assistance device in physical contact with the subject, wirelessly sending data from the first hearing assistance device to a second hearing assistance device regarding a detected possible fall, and wirelessly sending data from the first hearing assistance device to an accessory device regarding a detected possible fall and whether the possible fall was detected by only the first hearing assistance device or by both the first hearing assistance device and the second hearing assistance device.

In a sixty-eighth aspect, a hearing assistance system is included having a hearing assistance device can include a first control circuit, a first motion sensor in electrical communication with the first control circuit, wherein the first motion sensor is disposed in a fixed position relative to a head of a subject wearing the hearing assistance device, a first microphone in electrical communication with the first control circuit, a first transducer for generating sound in electrical communication with the first control circuit, a first power supply circuit in electrical communication with the first control circuit, an accessory device in electronic communication with the hearing assistance device, wherein at least one of the hearing assistance device and the accessory device is configured to evaluate data in phases to detect a possible fall of a subject in physical contact with the hearing assistance device, the phases including pre-fall monitoring, falling phase detection, impact detection, and post-fall monitoring.

In a sixty-ninth aspect, in addition to one or more of the preceding or following aspects, or in the alternative to some aspects, pre-fall monitoring includes tracking total acceleration signal (SV_tot) peaks and comparing them against a threshold value, wherein falling phase detection includes tracking vertical acceleration, estimating vertical velocity, comparing fall duration against a threshold, comparing minimum total acceleration signal (SV_tot) against a threshold, comparing vertical velocity against a threshold, and monitoring posture change, wherein impact detection includes evaluating a width and amplitude of vertical acceleration peaks against threshold values, evaluating total acceleration signal (SV_tot) amplitude against thresholds based on pre-fall peaks, and monitoring posture change, within a time window after initiation of a falling phase, and wherein post-fall monitoring includes posture detection based on an estimated direction of gravity and activity level detection.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

DETAILED DESCRIPTION

Figure 1:
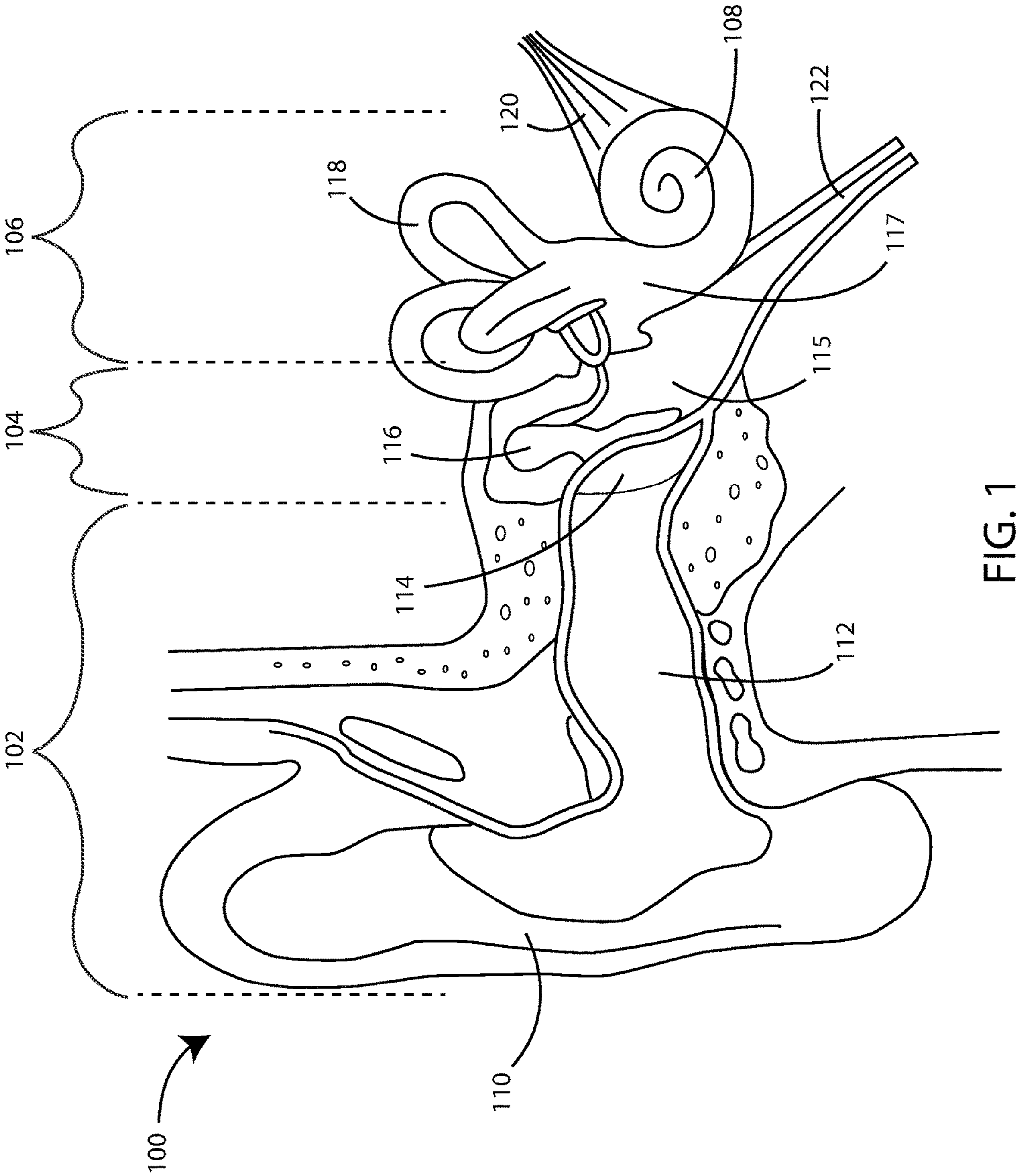
FIG. 1 is a partial cross-sectional view of ear anatomy.

As described above, individuals who have fallen may need assistance in getting up and/or may need to notify someone else of their fall. However, many people are somewhat disoriented after they have fallen making communication more difficult. In addition, typical means of contacting someone else for assistance or notification purposes, such as placing a telephone call, may be hard to execute for someone who has fallen. Therefore, systems that can detect possible falls and automatically send communications such as alerts can be advantageous.

Previous fall detection and personal emergency response systems (PERS) have contributed to a perceived loss of self-efficacy and age-based stereotypes. There are numerous psychosocial difficulties related to PERS use, particularly prior to an individual suffering from serious fall. Therefore, it can be advantageous to combine fall detection capabilities into less conspicuous and more commonly-worn items such as hearing assistance devices.

In addition, head-worn fall detection devices (such as embodiments of hearing assistance devices with fall detection features herein) are particularly advantageous when a fall involves a head impact, a traumatic brain injury (TBI), a loss of consciousness, and any resulting sense of confusion. In fact, falls are responsible for more than 60% of hospitalizations involving head injuries in older adults.

Further, hearing assistance devices with fall detection features herein also benefit from natural human biomechanics which often act to steady and protect the head. The velocity of the head during a fall collision is a key metric for gauging the severity of the fall impact. Due to placement of hearing assistance devices on or in the ear, such devices are less susceptible to spurious movements than fall detection devices that a worn on other parts of the body, e.g. on an arm or hung around the neck. With fewer artifacts to manage, in addition to having the greatest distance to fall, head-worn fall detection devices such as hearing assistance devices herein can be tuned to capture a greater number of falls, including those with softer impacts or slower transitions, as are frequently observed among older adults. In addition, individuals with hearing loss are also at a higher risk for falls.

Hearing assistance devices herein that provide both hearing assistance and fall detection alerting are also advantageous because they can free device users from the burden of wearing separate devices for managing their hearing difficulties and their propensity to fall.

Unfortunately, though, it is still very difficult to design a fall detection system that is perfectly accurate. Instead, a fall detection system must balance the rate and annoyance of false-positive alarms with the potential impacts of missing the detection of true falls.

Various embodiments of devices, systems and methods herein provide a high rate of sensitivity while mitigating the rate of false positives. In various embodiments herein, motions sensor data and/or other sensor data from a binaural set (pair) of hearing assistance devices can be used to more accurately detect falls and therefore maintain high sensitivity while reducing false-positives. In various embodiments herein, the wearer of a device such as a hearing assistance device (as part of a binaural set of devices or as a single device) can be provided with an opportunity to actively cancel a fall alert that is a false-positive. In various embodiments, machine learning techniques can be applied to data gathered from devices such as hearing assistance devices and possible accessories along with paired data regarding whether the gathered data related to true-positive or false-positive fall occurrences in order to further enhance fall detection sensitivity and reduce false-positives.

The term "hearing assistance device" as used herein shall refer to devices that can aid a person with impaired hearing. The term "hearing assistance device" shall also refer to devices that can produce optimized or processed sound for persons with normal hearing. Hearing assistance devices herein can include hearables (e.g., wearable earphones, headphones, earbuds, virtual reality headsets), hearing aids (e.g., hearing instruments), cochlear implants, and bone-conduction devices, for example. Hearing assistance devices include, but are not limited to, behind-the-ear (BTE), in-the ear (ITE), in-the-canal (ITC), invisible-in-canal (IIC), receiver-in-canal (RIC), receiver in-the-ear (RITE) or completely-in-the-canal (CIC) type hearing assistance devices or some combination of the above. In some embodiments, the hearing assistance devices may comprise a contralateral routing of signal (CROS) or bilateral microphones with contralateral routing of signal (BiCROS) amplification system. In some embodiments herein, a hearing assistance device may also take the form of a piece of jewelry, including the frames of glasses, that may be attached to the head on or about the ear.

Referring now to FIG. 1, a partial cross-sectional view of ear anatomy 100 is shown. The three parts of the ear anatomy 100 are the outer ear 102, the middle ear 104 and the inner ear 106. The outer ear 102 includes the pinna 110, ear canal 112, and the tympanic membrane 114 (or eardrum). The middle ear 104 includes the tympanic cavity 115 and auditory bones 116 (malleus, incus, stapes). The inner ear 106 includes the cochlea 108, vestibule 117, semicircular canals 118, and auditory nerve 120. "Cochlea" means "snail" in Latin; the cochlea gets its name from its distinctive coiled up shape. The pharyngotympanic tube 122 is in fluid communication with the eustachian tube and helps to control pressure within the middle ear generally making it equal with ambient air pressure.

Sound waves enter the ear canal 112 and make the tympanic membrane 114 vibrate. This action moves the tiny chain of auditory bones 116 (ossicles—malleus, incus, stapes) in the middle ear 104. The last bone in this chain contacts the membrane window of the cochlea 108 and makes the fluid in the cochlea 108 move. The fluid movement then triggers a response in the auditory nerve 120. In some embodiments, the auditory nerve 120 may alternatively be stimulated by implantable electrodes of a cochlear implant device.

Hearing assistance devices, such as hearing aids and hearables (e.g., wearable earphones), can include an enclosure, such as a housing or shell, within which internal components are disposed. Components of a hearing assistance device herein can include a control circuit, digital signal processor (DSP), memory (such as non-volatile memory), power management circuitry, a data communications bus, one or more communication devices (e.g., a radio, a near-field magnetic induction device), one or more antennas, one or more microphones, a receiver/speaker, and various sensors as described in greater detail below. More advanced hearing assistance devices can incorporate a long-range communication device, such as a Bluetooth® transceiver or other type of radio frequency (RF) transceiver.

Figure 2:
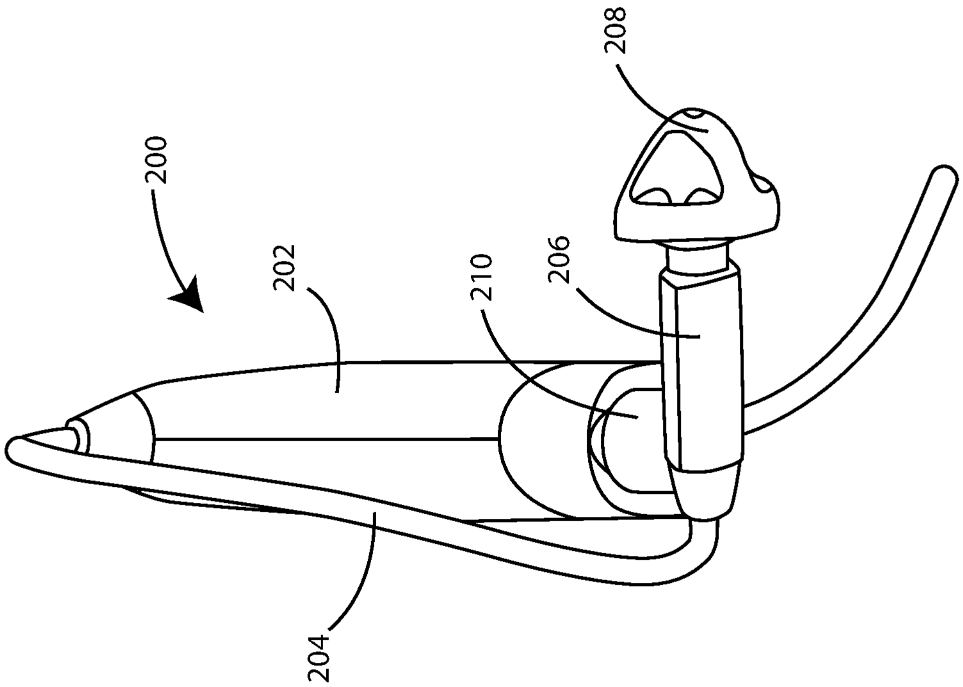
FIG. 2 is a schematic view of a hearing assistance device in accordance with various embodiments herein.

Referring now to FIG. 2, a schematic view of a hearing assistance device 200 is shown in accordance with various embodiments herein. The hearing assistance device 200 can include a hearing assistance device housing 202. The hearing assistance device housing 202 can define a battery compartment 210 into which a battery can be disposed to provide power to the device. The hearing assistance device 200 can also include a receiver 206 adjacent to an earbud 208. The receiver 206 an include a component that converts electrical impulses into sound, such as an electroacoustic transducer, speaker, or loud speaker. A cable 204 or connecting wire can include one or more electrical conductors and provide electrical communication between components inside of the hearing assistance device housing 202 and components inside of the receiver 206.

The hearing assistance device 200 shown in FIG. 2 is a receiver-in-canal type device and thus the receiver is designed to be placed within the ear canal. However, it will be appreciated that may different form factors for hearing assistance devices are contemplated herein. As such, hearing assistance devices herein can include, but are not limited to, behind-the-ear (BTE), in-the ear (ITE), in-the-canal (ITC), invisible-in-canal (IIC), receiver-in-canal (RIC), receiver in-the-ear (RITE) and completely-in-the-canal (CIC) type hearing assistance devices. Aspects of hearing assistance devices and functions thereof are described in U.S. Pat. No. 9,848,273; U.S. Publ. Pat. Appl. No. 20180317837; and U.S. Publ. Pat. Appl. No. 20180343527, the content of all of which is herein incorporated by reference in their entirety.

Hearing assistance devices of the present disclosure can incorporate an antenna arrangement coupled to a high-frequency radio, such as a 2.4 GHz radio. The radio can conform to an IEEE 802.11 (e.g., WIFI®) or Bluetooth® (e.g., BLE, Bluetooth® 4. 2 or 5.0, and Bluetooth® Long Range) specification, for example. It is understood that hearing assistance devices of the present disclosure can employ other radios, such as a 900 MHz radio. Hearing assistance devices of the present disclosure can be configured to receive streaming audio (e.g., digital audio data or files) from an electronic or digital source. Hearing assistance devices herein can also be configured to switch communication schemes to a long-range mode of operation, wherein, for example, one or more signal power outputs may be increased and data packet transmissions may be slowed or repeated to allow communication to occur over longer distances than that during typical modes of operation. Representative electronic/digital sources (also serving as examples of accessory devices herein) include an assistive listening system, a TV streamer, a radio, a smartphone, a cell phone/entertainment device (CPED), a pendant, wrist-worn device, or other electronic device that serves as a source of digital audio data or files.

Figure 3:
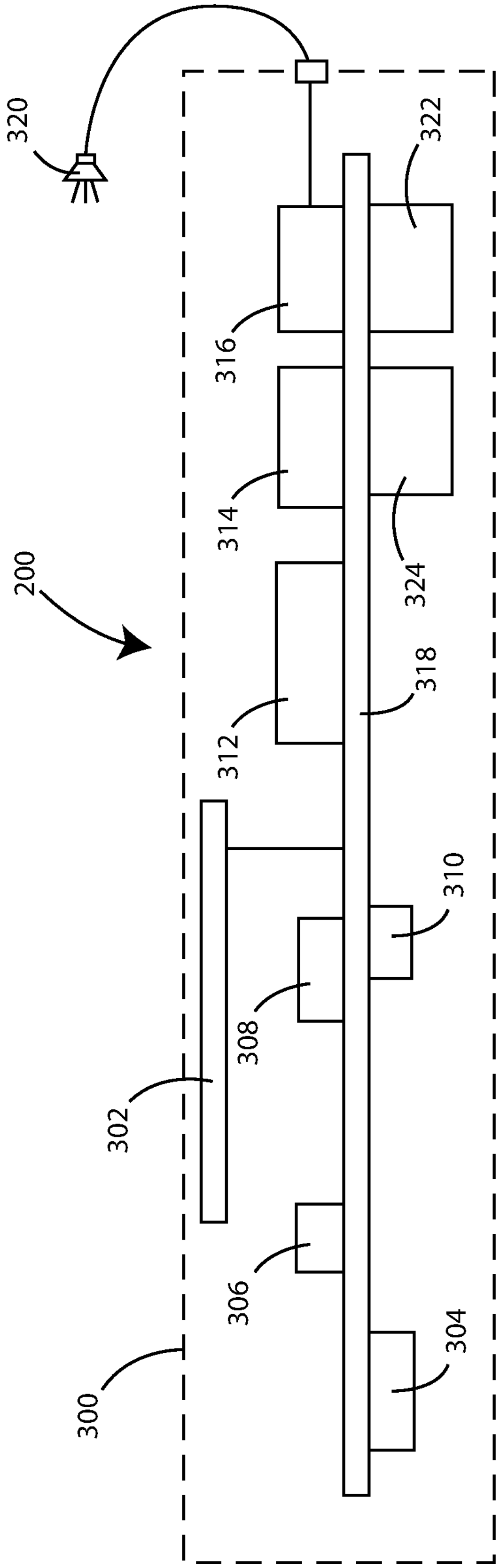
FIG. 3 is a schematic view of various components of a hearing assistance device in accordance with various embodiments herein.

Referring now to FIG. 3, a schematic block diagram is shown with various components of a hearing assistance device in accordance with various embodiments. The block diagram of FIG. 3 represents a generic hearing assistance device for purposes of illustration. The hearing assistance device 200 shown in FIG. 3 includes several components electrically connected to a flexible mother circuit 318 (e.g., flexible mother board) which is disposed within housing 300. A power supply circuit 304 can include a battery and can be electrically connected to the flexible mother circuit 318 and provides power to the various components of the hearing assistance device 200. One or more microphones 306 are electrically connected to the flexible mother circuit 318, which provides electrical communication between the microphones 306 and a digital signal processor (DSP) 312. Among other components, the DSP 312 incorporates or is coupled to audio signal processing circuitry configured to implement various functions described herein. A sensor package 314 can be coupled to the DSP 312 via the flexible mother circuit 318. The sensor package 314 can include one or more different specific types of sensors such as those described in greater detail below. One or more user switches 310 (e.g., on/off, volume, mic directional settings) are electrically coupled to the DSP 312 via the flexible mother circuit 318.

An audio output device 316 is operatively connected to the DSP 312 via the flexible mother circuit 318. In some embodiments, the audio output device 316 comprises a speaker (coupled to an amplifier). In other embodiments, the audio output device 316 comprises an amplifier coupled to an external receiver 320 adapted for positioning within an ear of a wearer. The external receiver 320 can include a transducer, speaker, or loud speaker. It will be appreciated that external receiver 320 may, in some embodiments, be an electrode array transducer associated with a cochlear implant or brainstem implant device. The hearing assistance device 200 may incorporate a communication device 308 coupled to the flexible mother circuit 318 and to an antenna 302 directly or indirectly via the flexible mother circuit 318. The communication device 308 can be a Bluetooth® transceiver, such as a BLE (Bluetooth® low energy) transceiver or other transceiver (e.g., an IEEE 802.11 compliant device). The communication device 308 can be configured to communicate with one or more external devices, such as those discussed previously, in accordance with various embodiments. In various embodiments, the communication device 308 can be configured to communicate with an external visual display device such as a smart phone, a video display screen, a tablet, a computer, or the like.

In various embodiments, the hearing assistance device 200 can also include a control circuit 322 and a memory storage device 324. The control circuit 322 can be in electrical communication with other components of the device. The control circuit 322 can execute various operations, such as those described herein. The control circuit 322 can include various components including, but not limited to, a microprocessor, a microcontroller, an FPGA (field-programmable gate array) processing device, an ASIC (application specific integrated circuit), or the like. The memory storage device 324 can include both volatile and non-volatile memory. The memory storage device 324 can include ROM, RAM, flash memory, EEPROM, SSD devices, NAND chips, and the like. The memory storage device 324 can be used to store data from sensors as described herein and/or processed data generated using data from sensors as described herein, including, but not limited to, information regarding exercise regimens, performance of the same, visual feedback regarding exercises, and the like.

Figure 4:
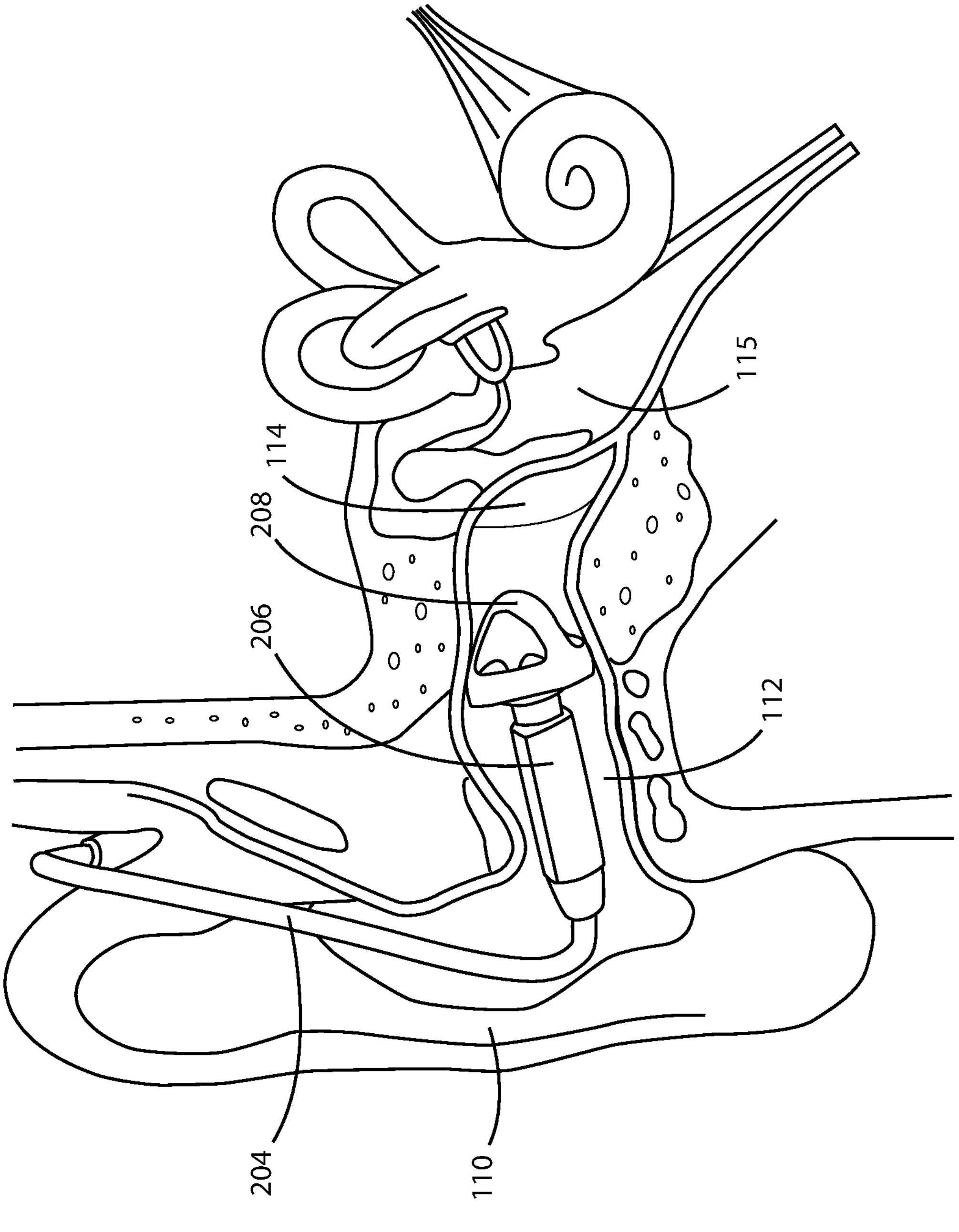
FIG. 4 is a schematic view of a hearing assistance device disposed within the ear of a subject in accordance with various embodiments herein.

As mentioned with regard to FIG. 2, the hearing assistance device 200 shown in FIG. 2 is a receiver-in-canal type device and thus the receiver is designed to be placed within the ear canal. Referring now to FIG. 4, a schematic view is shown of a hearing assistance device disposed within the ear of a subject in accordance with various embodiments herein. In this view, the receiver 206 and the earbud 208 are both within the ear canal 112, but do not directly contact the tympanic membrane 114. The hearing assistance device housing is mostly obscured in this view behind the pinna 110, but it can be seen that the cable 204 passes over the top of the pinna 110 and down to the entrance to the ear canal 112.

While FIG. 4 shows a single hearing assistance device, it will be appreciated that subjects can utilize two hearing assistance devices, such as one for each ear. In such cases, the hearing assistance devices and sensors therein can be disposed on opposing lateral sides of the subject's head. In specific, the hearing assistance devices and sensors therein can be disposed in a fixed position relative to the subject's head. In some embodiments, the hearing assistance devices and sensors therein can be disposed within opposing ear canals of the subject. In some embodiments, the hearing assistance devices and sensors therein can be disposed on or in opposing ears of the subject. The hearing assistance devices and sensors therein can be spaced apart from one another by a distance of at least 3, 4, 5, 6, 8, 10, 12, 14, or 16 centimeters and less than 40, 30, 28, 26, 24, 22, 20 or 18 centimeters, or by a distance falling within a range between any of the foregoing.

Figure 5:
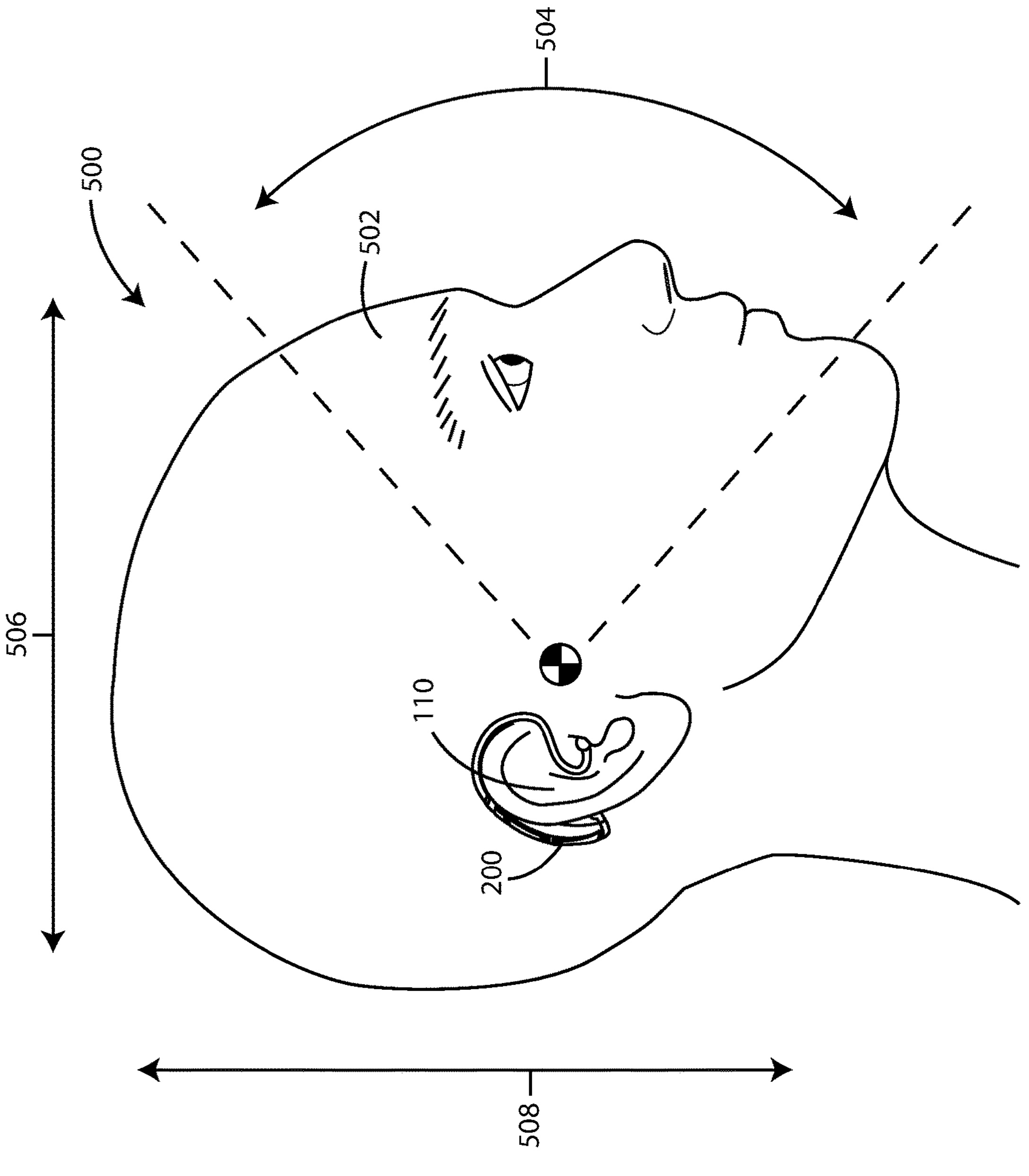
FIG. 5 is a schematic side view of a subject wearing a hearing assistance device in accordance with various embodiments herein.
Figure 6:
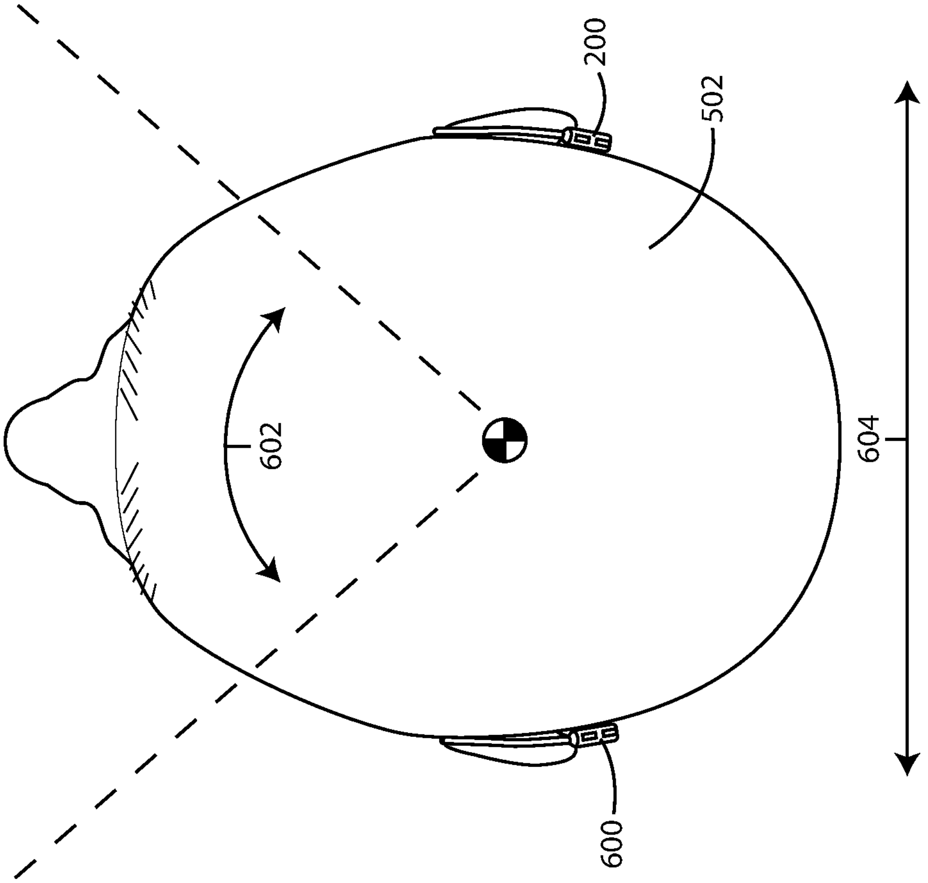
FIG. 6 is a schematic top view of a subject wearing a hearing assistance device in accordance with various embodiments herein.

Systems herein, and in particular components of systems such as hearing assistance devices herein, can include sensors (such as part of a sensor package 314) to detect movements of the subject wearing the hearing assistance device. Exemplary sensors are described in greater detail below. Referring now to FIG. 5, a schematic side view is shown of a subject 500 wearing a hearing assistance device 200 in accordance with various embodiments herein. For example, movements (motion) detected can include forward/back movements 506, up/down movements 508, and rotational movements 504 in the vertical plane. In various embodiments herein, subjects can wear two hearing assistance devices. The two hearing assistance devices can be paired to one another as a binaural set and can directly communicate with one another. Referring now to FIG. 6, a schematic top view is shown of a subject 500 wearing hearing assistance devices 200, 600 in accordance with various embodiments herein. Movements detected, amongst others, can also include side-to-side movements 604, and rotational movements 602 in the horizontal plane. As described above, embodiments of systems herein, such as hearing assistance devices, can track the motion or movement of a subject using motion sensors associated with the hearing assistance devices and/or associated with accessory devices. The head position and head motion of the subject can be tracked. The posture and change in posture of the subject can be tracked. The acceleration associated with movements of the subject can be tracked.

Figure 7:
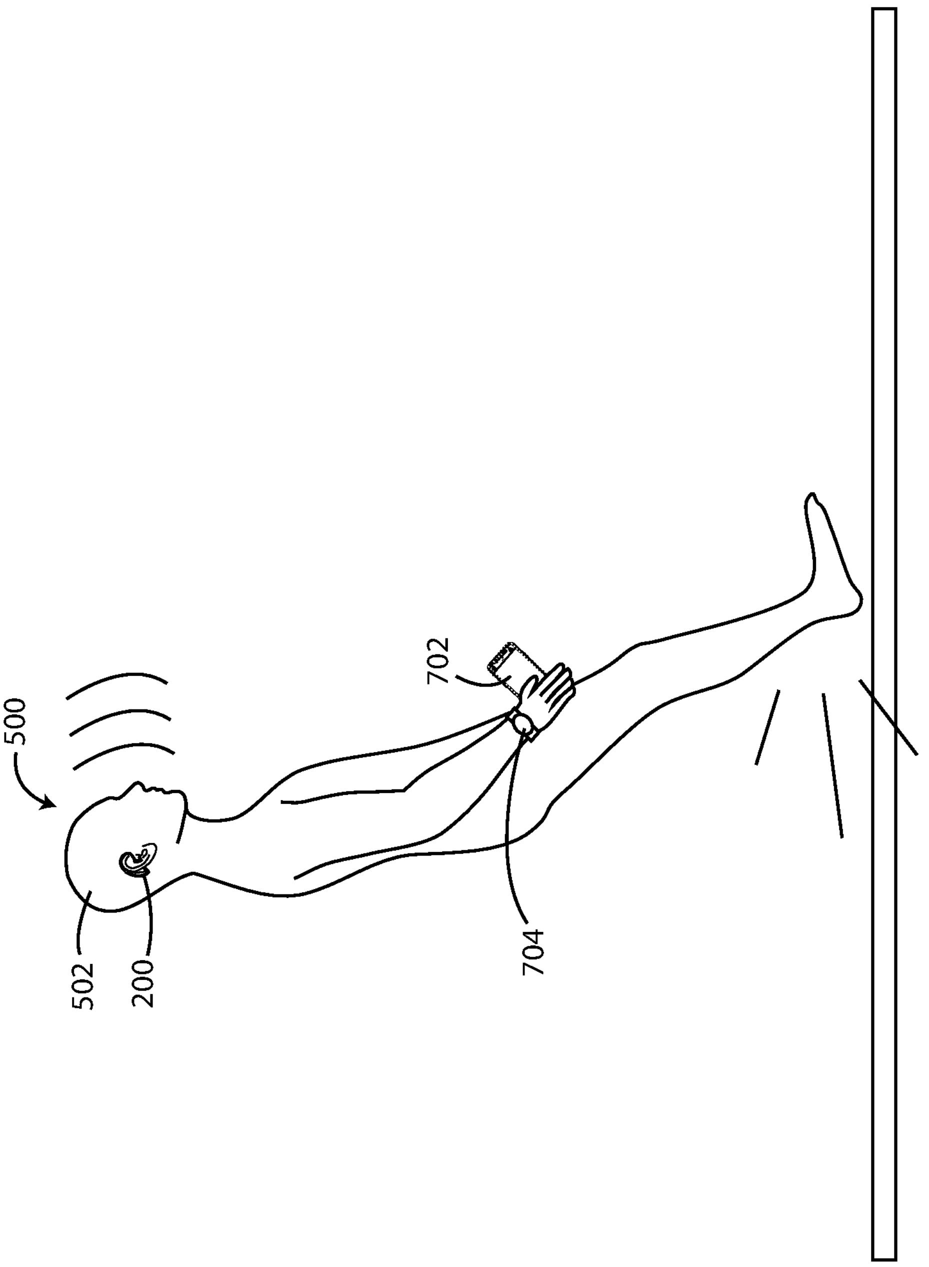
FIG. 7 is a schematic view of a subject experiencing a fall while wearing a hearing assistance device in accordance with various embodiments herein.

Referring now to FIG. 7, a schematic view is shown of a subject 500 experiencing a fall. In this view, the subject 500 is wearing a hearing assistance device 200 that is (as worn) in a fixed position relative to their head 502. In this case, the subject 500 also has a first accessory device 702. In this example, the subject also has a second accessory device 704. Accessory devices herein can include, but are not limited to, a smart phone, cellular telephone, personal digital assistant, personal computer, streaming device, wide area network device, personal area network device, remote microphone, smart watch, home monitoring device, internet gateway, hearing aid accessory, TV streamer, wireless audio streaming device, landline streamer, remote control, Direct Audio Input (DAI) gateway, audio gateway, telecoil receiver, hearing device programmer, charger, drying box, smart glasses, a captioning device, a wearable or implantable health monitor, and combinations thereof, or the like. Hardware components consistent with various accessory devices are described in U.S. Publ. Appl. No. 2018/0341582, the content of which is herein incorporated by reference.

Figure 8:
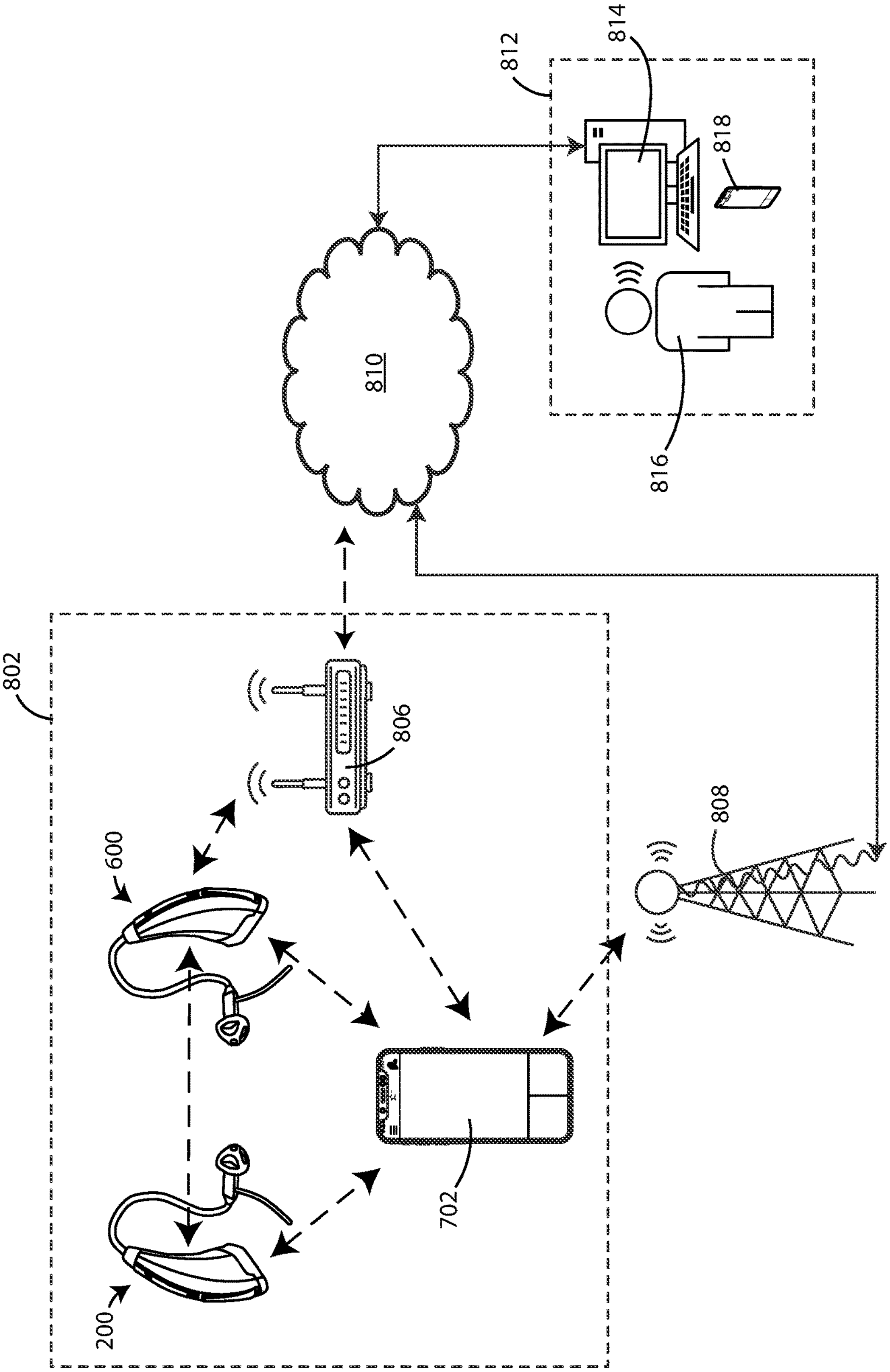
FIG. 8 is a schematic diagram of data and/or electronic signal flow as part of a system in accordance with various embodiments herein.

It will be appreciated that data and/or signals can be exchanged between many different components in accordance with embodiments herein. Referring now to FIG. 8, a schematic view is shown of data and/or signal flow as part of a system in accordance with various embodiments herein. In a first location 802, a subject (not shown) can have a first hearing assistance device 200 and a second hearing assistance device 600. Each of the hearing assistance devices 200, 600 can include sensor packages as described herein including, for example, a motion sensor. The hearing assistance devices 200, 600 and sensors therein can be disposed on opposing lateral sides of the subject's head. The hearing assistance devices 200, 600 and sensors therein can be disposed in a fixed position relative to the subject's head. The hearing assistance devices 200, 600 and sensors therein can be disposed within opposing ear canals of the subject. The hearing assistance devices 200, 600 and sensors therein can be disposed on or in opposing ears of the subject. The hearing assistance devices 200, 600 and sensors therein can be spaced apart from one another by a distance of at least 3, 4, 5, 6, 8, 10, 12, 14, or 16 centimeters and less than 40, 30, 28, 26, 24, 22, 20 or 18 centimeters, or by a distance falling within a range between any of the foregoing.

In various embodiments, data and/or signals can be exchanged directly between the first hearing assistance device 200 and the second hearing assistance device 600. Data and/or signals can be exchanged wirelessly using various techniques including inductive techniques (such as near-field magnetic induction—NFMI), 900 MHz communications, 2.4 GHz communications, communications at another frequency, FM, AM, SSB, BLUETOOTH™, Low Energy BLUETOOTH™, Long Range BLUETOOTH™, IEEE 802.11 (wireless LANs) wi-fi, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

An accessory device 702 such as a smart phone, smart watch, home monitoring device, internet gateway, hear aid accessory, or the like, can also be disposed within the first location 802. The accessory device 702 can exchange data and/or signals with one or both of the first hearing assistance device 200 and the second hearing assistance device 600 and/or with an accessory to the hearing assistance devices (e.g., a remote microphone, a remote control, a phone streamer, etc.).

Data and/or signals can be exchanged between the accessory device 702 and one or both of the hearing assistance devices (as well as from an accessory device to another location or device) using various techniques including, but not limited to inductive techniques (such as near-field magnetic induction—NFMI), 900 MHz communications, 2.4 GHz communications, communications at another frequency, FM, AM, SSB, BLUETOOTH™, Low Energy BLUETOOTH™, Long Range BLUETOOTH™, IEEE 802.11 (wireless LANs) wi-fi, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is also possible that forms of wireless mesh networks may be utilized to support communications between various devices, including devices worn by other individuals. It is understood that the standards which can be used include past and present standards. It is also contemplated that future versions of these standards and new future standards may be employed without departing from the scope of the present subject matter.

The accessory device 702 can also exchange data across a data network to the cloud 810, such as through a wireless signal connecting with a local gateway device, such as over a mesh network, such as a network router 806 or through a wireless signal connecting with a cell tower 808 or similar communications tower. In some embodiments, the external visual display device can also connect to a data network to provide communication to the cloud 810 through a direct wired connection.

In some embodiments, a third-party recipient 816 (such as a family member, a friend, a designated alert recipient, a care provider, or the like) can receive information from devices at the first location 802 remotely at a second location 812 through a data communication network such as that represented by the cloud 810. The third-party recipient 816 can use a computing device 814 or a different type of communications device 818 such as a smart phone to see and, in some embodiments, interact with the fall alert received. The fall alert can come through in various ways including, but not limited to, an SMS text message or other text message, VOIP communication, an email, an app notification, a call, artificial intelligence action set, or the like. The received information can include, but is not limited to, fall detection data, physiological data, environmental data relative to the location of the subject, contextual data, location data of the subject, map data indication the location of the subject, and the like. In some embodiments, received information can be provided to the third-party recipient 816 in real time.

As used herein, the term "physiological data" refers to information regarding the wearer's physiological state, e.g., at least one of a determined fall risk, inertial sensor data, heart rate information, blood pressure information, drug concentration information, blood sugar level, body hydration information, neuropathy information, blood oximetry information, hematocrit information, body temperature, age, sex, gait or postural stability attribute, vision, hearing, eye movement, neurological activity, or head movement. In one or more embodiments, physiological data can include psychological data representative of a psychological state such as a fear of falling. Such psychological state can, in one or more embodiments, be detected from physiological data such as heart rate. Further, in one or more embodiments, the physiological data can include one or more inputs provided by the wearer in response to one or more queries.

In some embodiments, the third-party recipient 816 can send information remotely from the second location 812 through a data communication network such as that represented by the cloud 810 to one or more devices at the first location 802. For example, the third-party recipient 816 can enter information into the computing device 814, can use a camera connected to the computing device 814 and/or can speak into the external computing device or a communications device 818 such as a smartphone, tablet, pager or the like. In some embodiments, a confirmation message can be sent back to the first location 802 when the third-party recipient 816 has received the alert.

Figure 9:
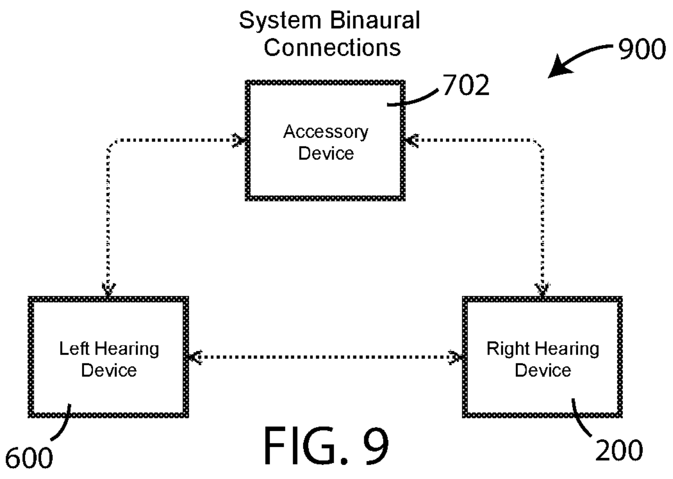
FIG. 9 is a schematic diagram of connections between system components in accordance with various embodiments herein.

Referring now to FIG. 9, a schematic diagram is shown of connections between system components in accordance with various embodiments herein. The system 900 can include a right hearing assistance device 200, a left hearing assistance device 600, and an accessory device 702. In a normal state, such as that shown in FIG. 9, wireless communication can take place directly being the right hearing assistance device 200 and the left hearing assistance device 600. The communication can include raw sensor data, processed sensor data (compressed, enhanced, selected, etc.), sensor feature data, physiological data, environmental data relative to the location of the subject, alerts, warnings, commands, signals, communication protocol elements, and the like. In a normal state, such as that shown in FIG. 9, both the right hearing assistance device 200 and the left hearing assistance device 600 are capable of being in wireless communication with an accessory device 702. Physiological data can include one or more of heart rate data, blood pressure data, core temperature data, electromyography (EMG) data, electrooculography (EOG) data, and electroencephalogram (EEG) data. Environmental data relative to the location of the device wearer (subject or user) can include one or more of location services data, ambient temperature and contextual data.

As used herein, the term "contextual data" refers to data representative of a context within which the subject is disposed or will be disposed at a future time. In one or more embodiments, contextual data can include at least one of weather condition, environmental condition, sensed condition, location, velocity, acceleration, direction, hazard beacon, type of establishment occupied by the wearer, camera information, or presence of stairs, etc. One or more hazard beacons can provide contextual data to the system. Such hazard beacons can include physical or virtual beacons as described, e.g., in U.S. Patent Publication No. 2018/0233018 A1, entitled FALL PREDICTION SYSTEM INCLUDING A BEACON AND METHOD OF USING SAME."

In various embodiments herein, systems and devices thereof can be configured to issue fall alerts automatically (e.g., without manual intervention). It will be appreciated, however, that systems and devices herein can also accommodate manually issued alerts. For example, regardless of whether a system or device detects a fall, a subject wearing hearing assistance devices herein can manually initiate a fall alert in various ways including, but not limited to, pushing a button or combination of buttons on a hearing assistance device, pushing real or virtual buttons on an accessory device, speaking a command received by a hearing assistance device, or the like.

Figure 10:
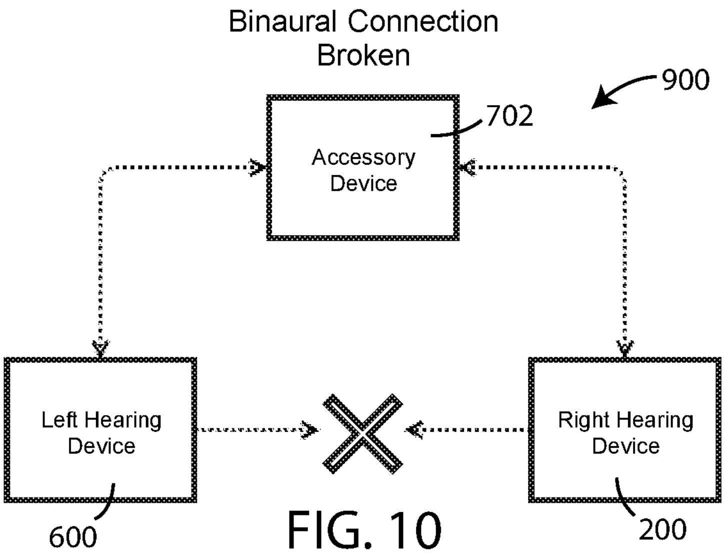
FIG. 10 is a schematic diagram of connections between system components when binaural communication is inoperative.

It will be appreciated, however, that in some scenarios communication between one or more elements of the system may be inoperative. Referring now to FIG. 10, a schematic diagram is shown of connections between system components when binaural communication is inoperative. In this state, wireless communication can take place between the left hearing assistance device 600 and the accessory device 702 and between the right hearing assistance device 200 and the accessory device 702, but not directly between the left hearing assistance device 600 and the right hearing assistance device 200. As another example, referring now to FIG. 11, a schematic diagram is shown of connections between system components when communication between one hearing assistance device and an accessory device is inoperative. In this state, wireless communication can take place directly between the left hearing assistance device 600 and the right hearing assistance device 200. Further, wireless communication can take place directly between the left hearing assistance device 600 and the accessory device 702. However, wireless communication between the right hearing assistance device 200 and the accessory device 702 is inoperative.

Figure 12:
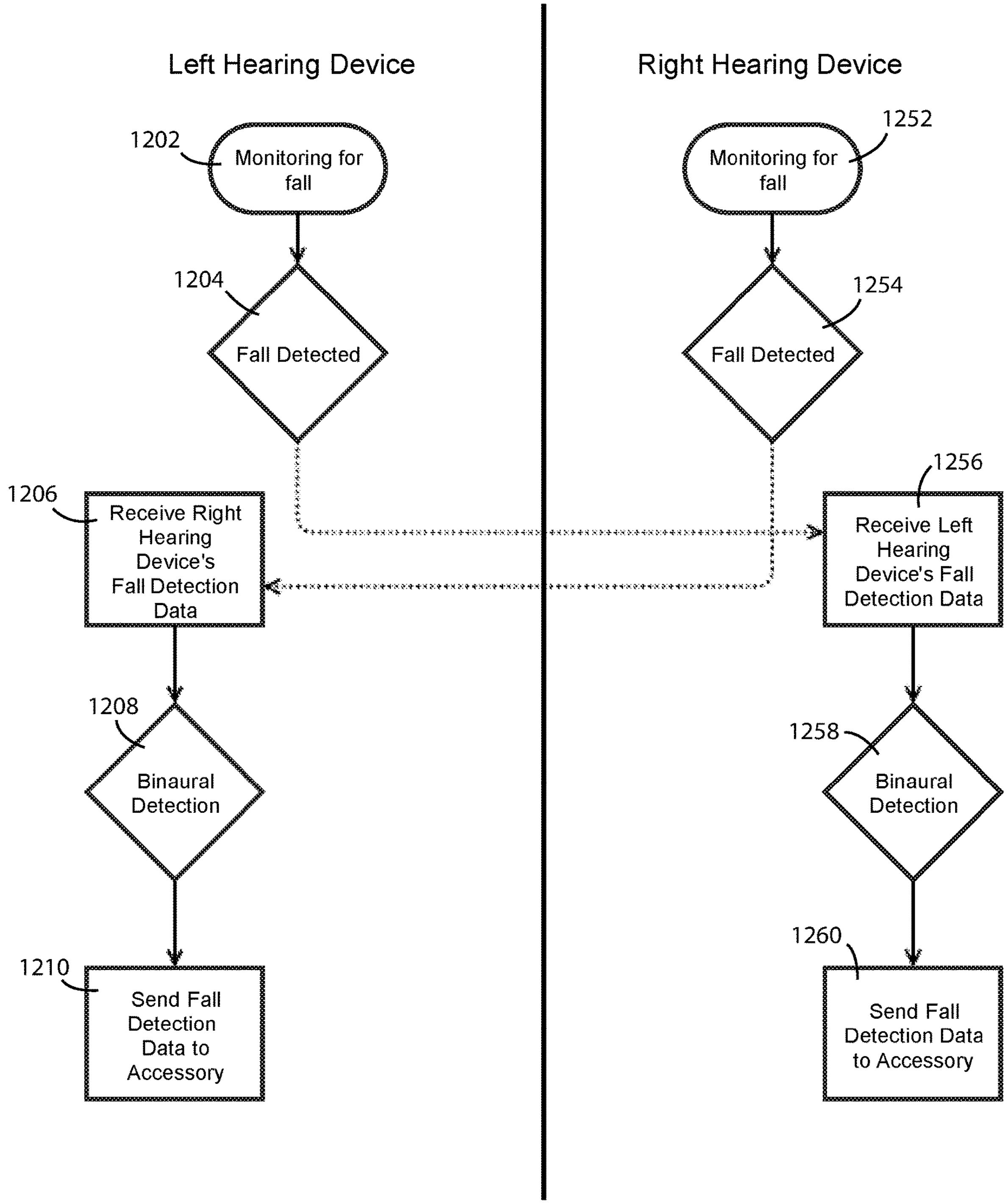
FIG. 12 is a flow chart of fall detection processes in a system including two paired hearing assistance devices that can communicate with one another.

Various operations can utilize both hearing assistance devices depending on the state of communications between components of the system. Referring now to FIG. 12, a flow chart is shown of fall detection processes in a system including two paired hearing assistance devices that can communicate with one another. The left hearing assistance device can monitor for a possible fall 1202. Monitoring for a possible fall can include evaluating data from one or more sensors to detect a possible fall of a subject in physical contact with the hearing assistance device. Simultaneously, the right hearing assistance device can monitor for a possible fall 1252.

If a fall is detected 1204 by the left hearing assistance device, then data can be stored in memory can be sent from the left hearing assistance device and this data can be received by the right hearing assistance device 1256. The right hearing assistance device can compare the received data against its own data, such as data gathered with its own sensors or derived therefrom to determine if the data is congruent. Similarly, if a fall is detected 1254 by the right hearing assistance device, then data can be stored in memory of the right hearing device and sent from the right hearing assistance device and this data can be received by the left hearing assistance device 1206. The left hearing assistance device can compare the received data against its own data, such as data gathered with its own sensors or derived therefrom to determine if the data is congruent.

In some embodiments, data from two devices (such as right and left) is deemed incongruent with one another if a spatial position of a first hearing assistance device as assessed with data from a first motion sensor with respect to a spatial position of a second hearing assistance device as assessed with data from a second motion sensor indicates that at least one of the first and second hearing assistance device is not being worn by the subject. In some embodiments, data from two devices is deemed incongruent with one another if movement of the first hearing assistance device as assessed with data from the first motion sensor with respect to movement of the second hearing assistance device as assessed with data from the second motion sensor indicates that at least one of the first and second hearing assistance device is not being worn by the subject. In some embodiments, data from two devices is deemed incongruent with one another if a temperature of the first hearing assistance device with respect to a temperature of the second hearing assistance device indicates that at least one of the first and second hearing assistance device is not being worn by the subject. In some embodiments, data from two devices is deemed incongruent with one another if physiological data gathered by at least one of the first hearing assistance device or the second hearing assistance device indicates that it is not being worn by the subject. In some embodiments, data from two devices is deemed incongruent with one another if the timing of features in the data (e.g., acceleration peaks, slopes, minima, maxima, etc.) does not match.

It is understood that the right hearing assistance device, the left hearing assistance device, and an accessory device may communicate and share data at any point and during any stage of a possible fall detection or balance event. These data may contain commands from one device to one or more of the other devices pertaining to the adaption of one or more of the sensor operations, sensor signal sampling rates, processing methods, wireless radio communications, etc. For example, a gyroscope consumes significantly more power than an accelerometer. Therefore, the gyroscope may not be powered on until certain motion features are detected within the signal of one or more of the accelerometers in a hearing assistance device or an accessory device. In some embodiments, the use of sensors may be duty-cycled between the various devices as a means to reduce power consumption. In at least one embodiment, communication from a first device to a second device may be to coordinate sensor duty cycling. In further embodiments, communication from a first device to a second device may include a command to initiate sensing from two or more devices at the onset detection of a possible fall or balance event. In some cases, communication/data passage between a first hearing assistance device and a second hearing assistance device can be direct. In some cases, communication/data passage between a first hearing assistance device and a second hearing assistance device can be indirect, such as by passing through an accessory device or another device.

The data shared by the right hearing assistance device, the left hearing assistance device, and an accessory device may be timestamped to insure proper alignment of the data during comparison. However, in other embodiments, the data shared by the right hearing assistance device and the left hearing assistance device do not need to be timestamped. Instead, some features of the data (e.g., motion sensor signal) may be identified as anchor points shared within the data from the respective devices. In further embodiments, certain other synchronized clock information may be imbedded into the data files from each the right hearing assistance device, the left hearing assistance device, and an accessory device.

When both the right and left hearing assistance device detect a fall, this can be referred to as binaural detection of a fall (or "binaural detection"). The data that is sent from the left hearing assistance device to the right hearing assistance device can specifically include fall detection data. Similarly, the data that is sent from the right hearing assistance device to the left hearing assistance device can specifically include fall detection data. Fall detection data herein can include various specific pieces of data including, but not limited to, raw sensor data, processed sensor data, features extracted from sensor data, physiological data, environmental data relative to the location of the subject, alerts, warnings, commands, signals, clock data, statistics relative to data, communication protocol elements, and the like.

In various embodiments, the presence of binaural detection of a fall 1208, 1258 can be tracked by the left hearing assistance device and the right hearing assistance device respectively. Data regarding the presence of binaural detection can then be sent on 1210, 1260 to one or more accessory devices along with fall detection data (such as the specific types of fall detection data referenced above) from both the left hearing assistance device and the right hearing assistance device. The accessory device(s) can compare the data received from the left hearing assistance device with the data received from the right hearing assistance device to determine if the data is congruent. In some embodiments the accessory device(s) can also compare sensor data gathered by the accessory devices themselves against the data received from the left hearing assistance device and the data received from the right hearing assistance device to determine if the data is congruent. In some embodiments, if the data is congruent and indicates that a fall has likely occurred then the accessory device(s) and/or the hearing assistance devices can issue and/or transmit a fall alert which can be transmitted directly or indirectly to a responsible party.

While not intending to be bound by theory, it is believed that sending fall detection data onto an accessory device from both hearing assistance devices can make the transmission of such data more robust since an interruption in communication between one of the hearing assistance devices and the accessory device(s), such as the scenario illustrated with regard to FIG. 9, would not prevent fall detection data from reaching the accessory device. In addition, sending on an indication of binaural detection onto the accessory device can improve accuracy of fall detection because two separate devices indicating a fall can be more reliable than simply one device indicating a fall. In some embodiments, the system can be configured so that if communications can be received from both hearing assistance devices, but only one hearing assistance device is indicating a fall, then no fall alert is issued or transmitted. This can prevent false-positives associated with one hearing device being removed from the ear and dropped onto a table and similar situations where one device is actually no longer in contact with the head of the subject.

Similarly, if the gathered data suggests that one hearing assistance device is no longer being worn by the subject, then data and fall alerts from that hearing assistance device can be ignored until further data suggests that the hearing assistance device is again being worn by the subject. The hearing assistance devices herein can utilize any type of auto on/off feature or ear placement detector to know when the hearing instruments are actually being worn by the subject. These types of detectors are well known by those skilled in the art, but could include capacitors, optical sensors, thermal sensors, inertial sensors, etc. If one or more devices is determined not be on the subject's ear, the system can take this information into account and potentially treat the off-ear device as being an inactive contributor with regards to triggering fall detections or for the process of data comparisons.

In some embodiments, if one hearing assistance device of a pair produces uncorrelated detections (i.e., false positives) at a rate crossing a threshold value or happening at least a threshold number of times, then detections originating with that hearing assistance device can be ignored or otherwise discarded or not acted upon by the system. In some embodiments, a message/notification to the subject, a caregiver, a professional, or the manufacturer can be sent such that the device may be serviced to correct the problem or to help assist in modifying the subject's behavior which may contribute to the problem.

In some embodiments, the absence of a near-field magnetic induction (NMFI) based connection between the right and left hearing assistance devices can be used as an indicator that at least one of the devices is not currently being worn by the subject. Near-field magnetic induction (NFMI) is an induction-based wireless communication technique that can be used to facilitate wireless communication between the two hearing assistance devices forming a binaural pair. As an induction-based technique, NFMI has a very limited range. In addition, the directionality of NFMI also limits the degree in angle that binaural hearing assistance devices may deviate from each other and remain connected. If one or both of the hearing assistance devices are not worn on the head, the hearing assistance devices are less likely to be close enough or positioned correctly to be in effective NFMI communication. As such, the presence or absence of an NFMI connection can be used as an indicator of hearing assistance device placement, and thus an indication as to whether or not the devices are being worn on or about the ears of the subject.

In some embodiments, a high-accuracy wireless location technique can be used to determine if the hearing assistance devices are close enough in proximity to each other to realistically be on the ears of the subject. Detection of a distance that is either too large (e.g., greater than 175, 200, 225, 250, 275, or 300 mm) or too small (e.g., less than 125, 100, 75, or 50 mm) can be used as an indicator that at least one of the devices is not currently being worn by the subject. In such a case, the system can be configured to ignore or otherwise disregard any fall alerts and/or data coming from hearing assistance devices that are not being worn by the device wearer.

Figure 13:
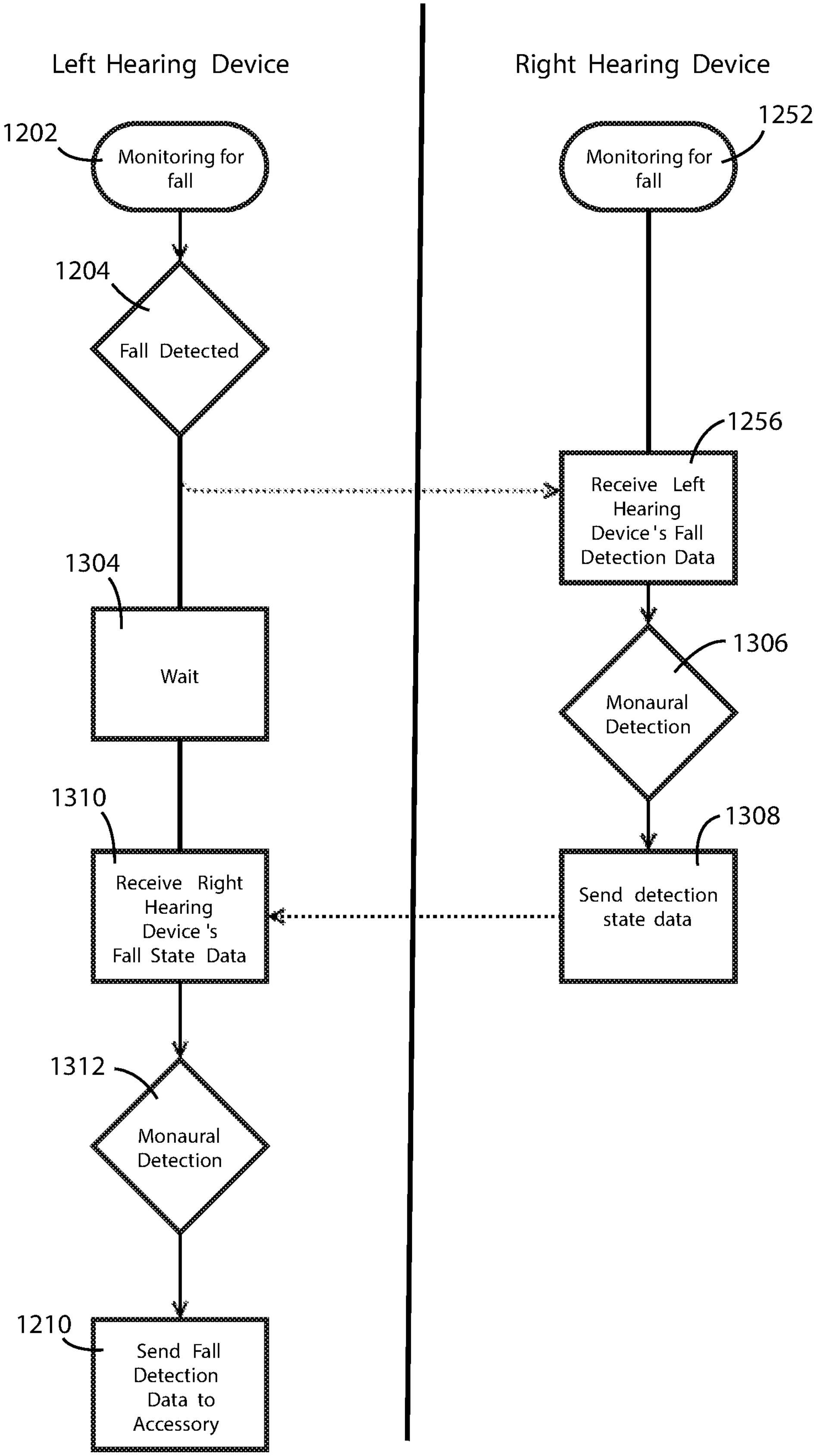
FIG. 13 is a flow chart of fall detection processes in a system including two paired hearing assistance devices that can communicate with one another.

In various embodiments herein, other operations can be executed if only one hearing assistance device detects a fall. For example, referring now to FIG. 13, a flow chart is shown of fall detection processes in a system including two paired hearing assistance devices that can communicate with one another, but where only one of the two paired hearing assistance devices detects a fall. The left hearing assistance device can monitor for a possible fall 1202. Simultaneously, the right hearing assistance device can monitor for a possible fall 1252. In some embodiments herein, monitoring for a notification includes polling at least one device.

In this example, a fall is detected 1204 by the left hearing assistance device, but not by the right hearing assistance device. After detection by the left hearing assistance device, data can be sent from the left hearing assistance device and this data can be received by the right hearing assistance device 1256. The data that is sent from the left hearing assistance device to the right hearing assistance device can specifically include fall detection data, such as that described above.

The right hearing assistance device, knowing that it has not similarly detected a fall, can record that only monaural detection 1306 (detection of a fall by only the right or left side device) has occurred. It can send data back to the left hearing assistance device 1308 including an indication that there is only monaural detection (or a simple indication of non-detection by the right hearing assistance device). In some cases, it can also send other data back to the left hearing assistance device including, but not limited to, raw sensor data, processed sensor data, features extracted from sensor data, physiological data, environmental data relative to the location of the subject, alerts, warnings, commands, signals, clock data, statistics relative to data, communication protocol elements, and the like. Such data from the right hearing assistance device can be received 1310 by the left hearing assistance device.

In various embodiments, the occurrence of monaural detection 1312 of a fall can be tracked by the left hearing assistance device. Data regarding the presence of binaural communication can then be sent on 1210 to one or more accessory devices along with fall detection data (such as the specific types of fall detection data referenced above) from both the left hearing assistance device and the right hearing assistance device.

As described above with reference to FIG. 10, in some cases communication may break down or otherwise may not be existent between a paired set of hearing assistance devices. In various embodiments herein, other operations can be executed if the two hearing assistance devices are not in communication with one another.

Figure 14:
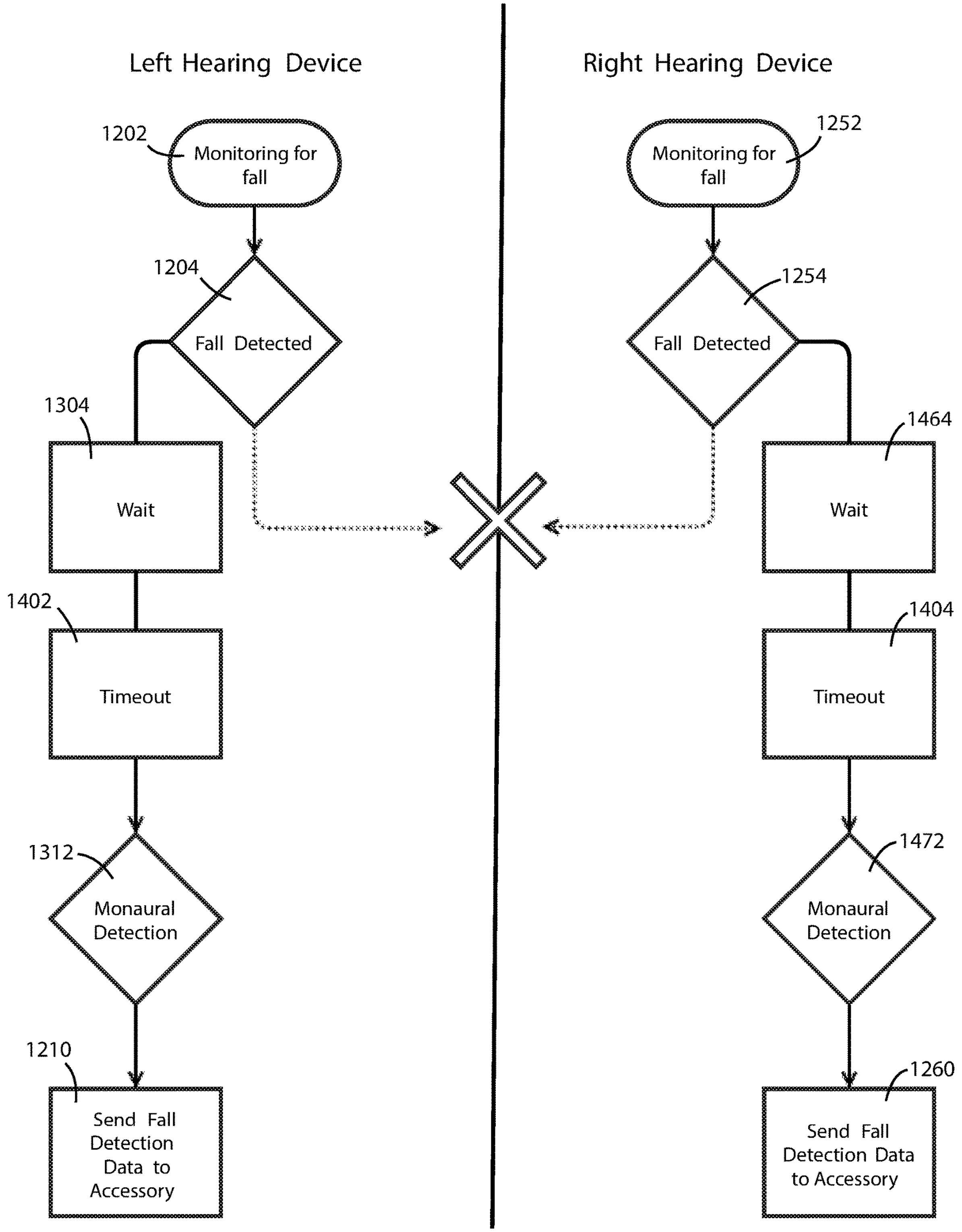
FIG. 14 is a flow chart of fall detection processes in a system including two paired hearing assistance devices that cannot communicate with one another.

Referring now to FIG. 14, a flow chart is shown of fall detection processes in a system including two paired hearing assistance devices that cannot communicate with one another. The left hearing assistance device can monitor for a possible fall 1202. Simultaneously, the right hearing assistance device can monitor for a possible fall 1252.

A fall is detected 1204 by the left hearing assistance device, then data can be sent from the left hearing assistance device to the right hearing assistance device, but in this case communication between the left and right hearing assistance devices is inoperative. Similarly, a fall is detected 1254 by the right hearing assistance device, then data can be sent from the right hearing assistance device to the left hearing assistance device, but again in this case communication between the left and right hearing assistance devices is inoperative.

After sending data to the right hearing assistance device, the left hearing assistance device can wait 1304 for a reply until an operation timeout 1402 occurs. Similarly, after sending data to the left hearing assistance device, the right hearing assistance device can wait 1464 for a reply until an operation timeout 1404 occurs.

After respective timeouts being reached (or timers lapsing), the left hearing assistance device can record that monaural detection 1312 has occurred (since the left hearing assistance device cannot communicate with the right hearing assistance device) and the right hearing assistance device can also record that monaural detection has occurred 1472 (since the right hearing assistance device cannot communicate with the left hearing assistance device). Data regarding the presence of monaural detection can then be sent on 1210, 1260 to one or more accessory devices along with fall detection data (such as the specific types of fall detection data referenced above) from both the left hearing assistance device and the right hearing assistance devices.

In some embodiments, the device receiving data (which could be one of the hearing assistance devices or an accessory device) can evaluate the received data for congruency (such as similar features in the data) and/or it can look at how closely in time notifications of independent, bilateral fall detections are received from the left and right device.

Figure 15:
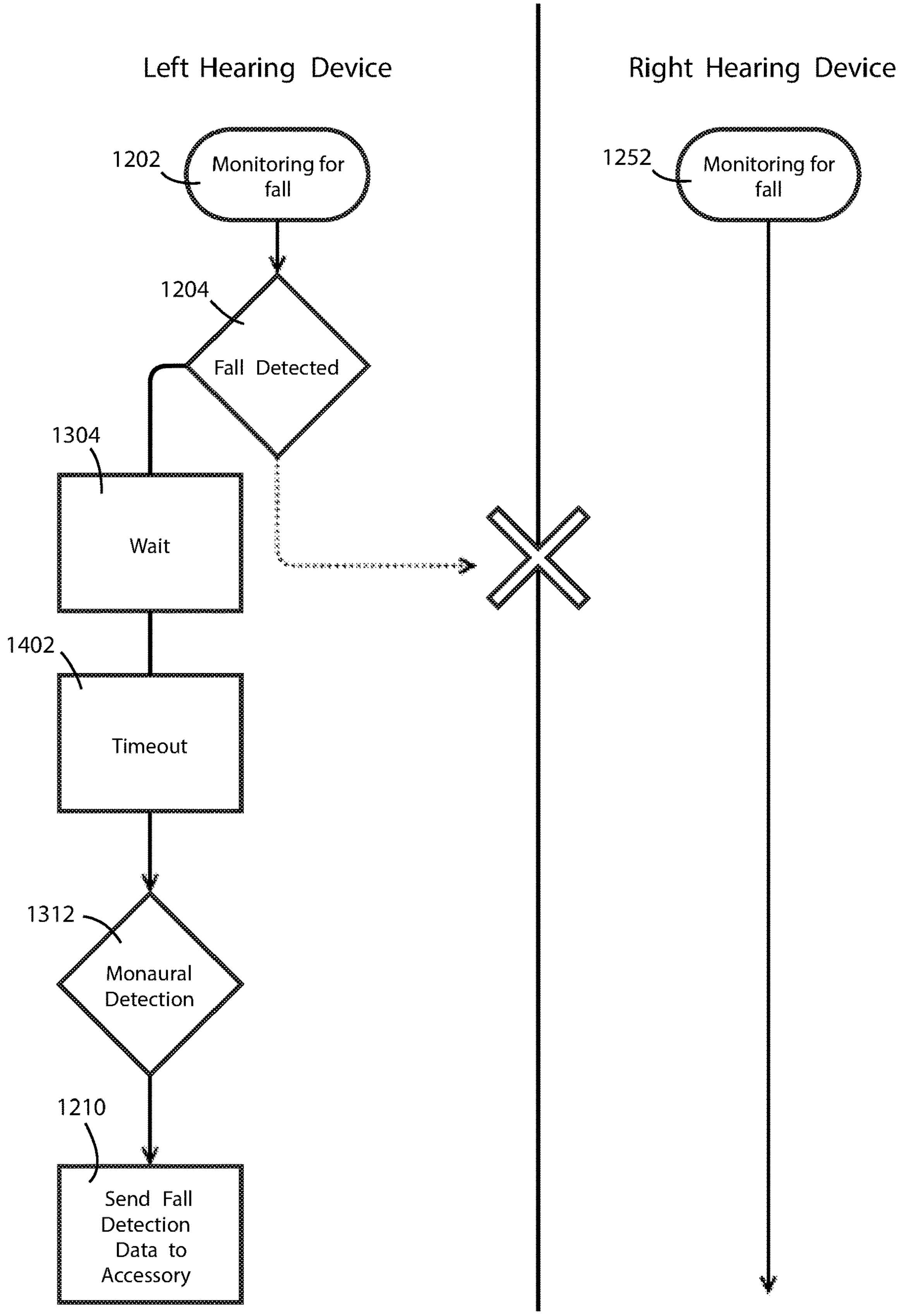
FIG. 15 is a flow chart of fall detection processes in a system including two paired hearing assistance devices that cannot communicate with one another.

In various embodiments herein, other operations can be executed if only one hearing assistance device detects a fall in the scenario of no communication between the two hearing assistance devices. Referring now to FIG. 15, a flow chart is shown of fall detection processes in a system including two paired hearing assistance devices that cannot communicate with one another and where only one of the two hearing assistance devices has detected a fall.

The left hearing assistance device can monitor for a possible fall 1202. Simultaneously, the right hearing assistance device can monitor for a possible fall 1252.

A fall is detected 1204 by the left hearing assistance device, then data can be sent from the left hearing assistance device to the right hearing assistance device, but in this case communication between the left and right hearing assistance devices is inoperative. In this scenario, a fall is never detected by the right hearing assistance device.

After sending data to the right hearing assistance device, the left hearing assistance device can wait 1304 for a reply until an operation timeout 1402 occurs. Then, the left hearing assistance device can record that monaural detection 1312 has occurred (since the left hearing assistance device cannot communicate with the right hearing assistance device). Data regarding the presence of monaural detection can then be sent on 1210 to one or more accessory devices along with fall detection data (such as the specific types of fall detection data referenced above) from only the left hearing assistance device.

Figure 16:
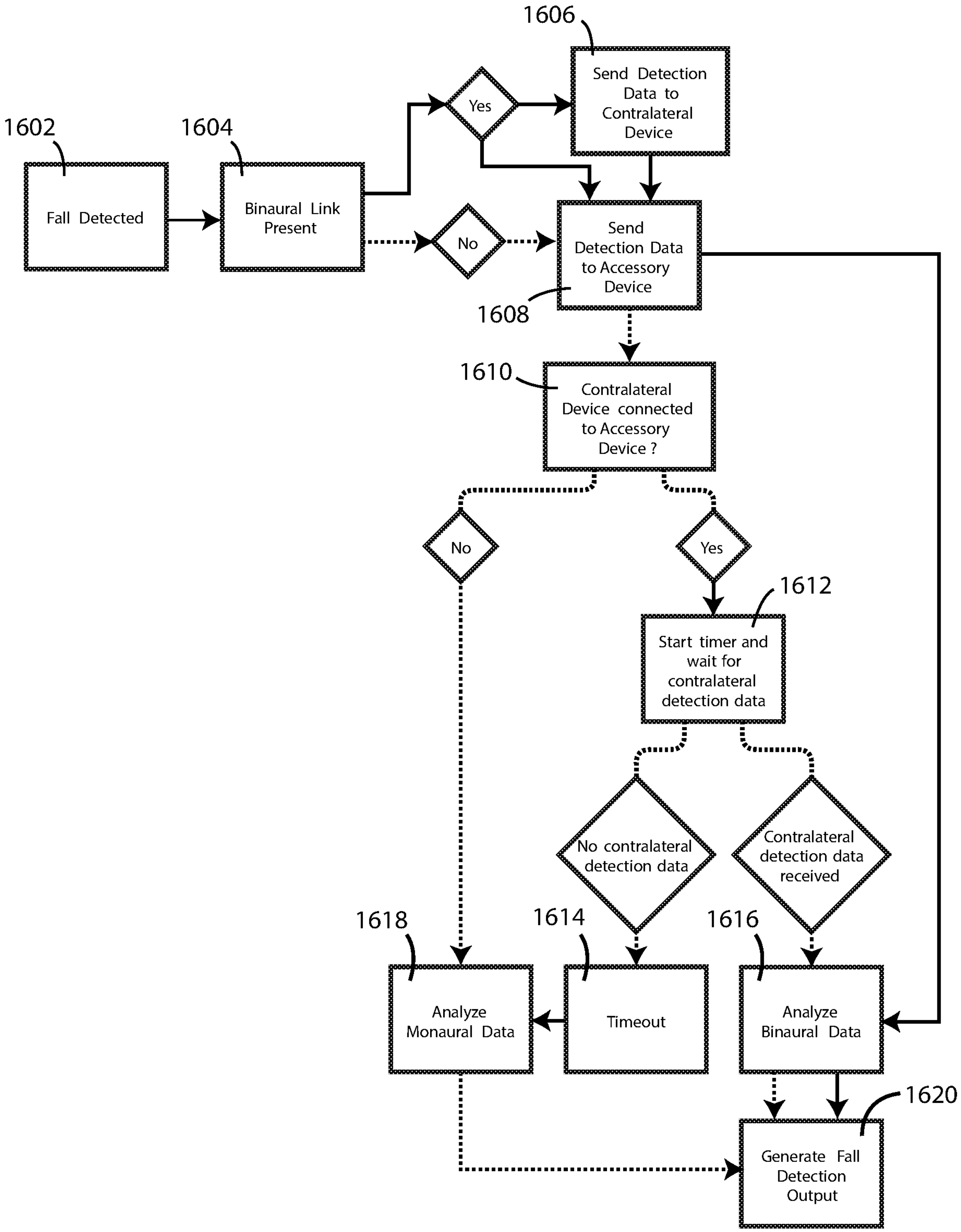
FIG. 16 is a flow chart of fall detection processes in a system in accordance with various embodiments herein.

Referring now to FIG. 16, a flow chart of fall detection processes in a system in accordance with various embodiments herein is shown. A fall can be detected 1602 by one of the right or left hearing assistance devices. The hearing assistance device that has detected the fall can then assess whether a binaural link (communication link between the left and right hearing assistance devices) exists 1604. This can be determined by pinging (or sending another communication protocol transmission or packet) to the other hearing assistance device or can be determined based on a recent successful communication. If a binaural link exists, then fall detection data can be sent onto the other device (e.g., the contralateral hearing assistance device) 1606. In some cases, fall detection data can be sent onto an accessory device simultaneously. If a binaural link does not exist, the fall detection data can be sent onto one or more accessory devices 1608.

Once the fall detection data is passed onto the accessory device from one hearing assistance device, then it can be determined whether the other hearing assistance device (contralateral) is also in communication with the accessory device(s) 1610. If not, then the fall detection data can be analyzed as monaural data 1618 (e.g., fall detection data from only one hearing assistance device). However, if it is determined that the accessory device(s) are in communication with the other hearing assistance device (the contralateral device), then a timer can be started 1612 and the system/accessory device(s) can wait to receive fall detection data from the contralateral device. If such data is received, then the fall detection data from both hearing assistance devices can be analyzed as binaural data 1616. However, if no fall detection data is received from the contralateral device and a timeout occurs 1614, then the fall detection data can be analyzed as monaural data 1618 (e.g., fall detection data from only one hearing assistance device). After analysis as monaural data 1618 or binaural data 1616, appropriate fall detection output 1620 can be generated.

In various embodiments, accessory devices herein can act as a relay to the cloud, but in some embodiments could be part of the cloud itself. The accessory device can be configured to process the data shared by the hearing instrument(s) and make the final detection decision. In some embodiments, the accessory device can calculate a confidence interval from one or more of inputs from the hearing assistance devices active in the system, the alignment or congruence of the data between devices, the parameters of the fall detection data or the inferred severity, a fall risk score associated with the subject, and a fall risk prediction statistic.

In some embodiments, the system and/or devices thereof can be configured to execute a delay, such that fall alerts will not be detected and/or generated for a period of time after the respective device is powered on placed on or in an ear, or otherwise activated. This allows the subject to put the hearing assistance devices on their ear before false-positive detections might occur during the process of them putting the hearing assistance devices on their ears.

In some embodiments, the system and/or devices thereof can be configured to allow receipt of a "pause" command that will cause the system and/or devices thereof to not issue fall alerts for a predefined period of time (such as 1 minute, 5 minutes, 30 minutes, 1 hour, 2 hours, 1 day, or an amount falling within a range between any of the foregoing). If a pause command is engaged, then fall alerts will not be detected and/or generated for the defined period of time. In further embodiments, the system and/or devices thereof can be configured to allow receipt of a "pause" command that will cause the system and/or devices thereof to not issue fall alerts for the duration of a selected activity that can be sensed or classified based on sensor data (such as the duration of an exercise routine or the duration of a roller-coaster ride). If a pause command is engaged, then fall alerts will not be detected and/or generated for the until the selected activity is sensed or otherwise indicated (manually or otherwise) to have ended. This allows the subject to avoid false-positive that may otherwise occur if activity is undertaken involving significant movement (such as when taking the devices off, engaging in behavior involving significant movement, etc.). Pause commands can be received from the device wearer in various ways. For example, a pause command could be entered via a user control on the hearing assistance devices or and accessory device (e.g., GUI button in an application on a smartphone). A pause command can also be via voice control, such as "pause my fall detection system". Pause commands can optionally include a desired length of time to pause the system in addition to or in replace of various lengths of time that are predefined for the subject.

Figure 17:
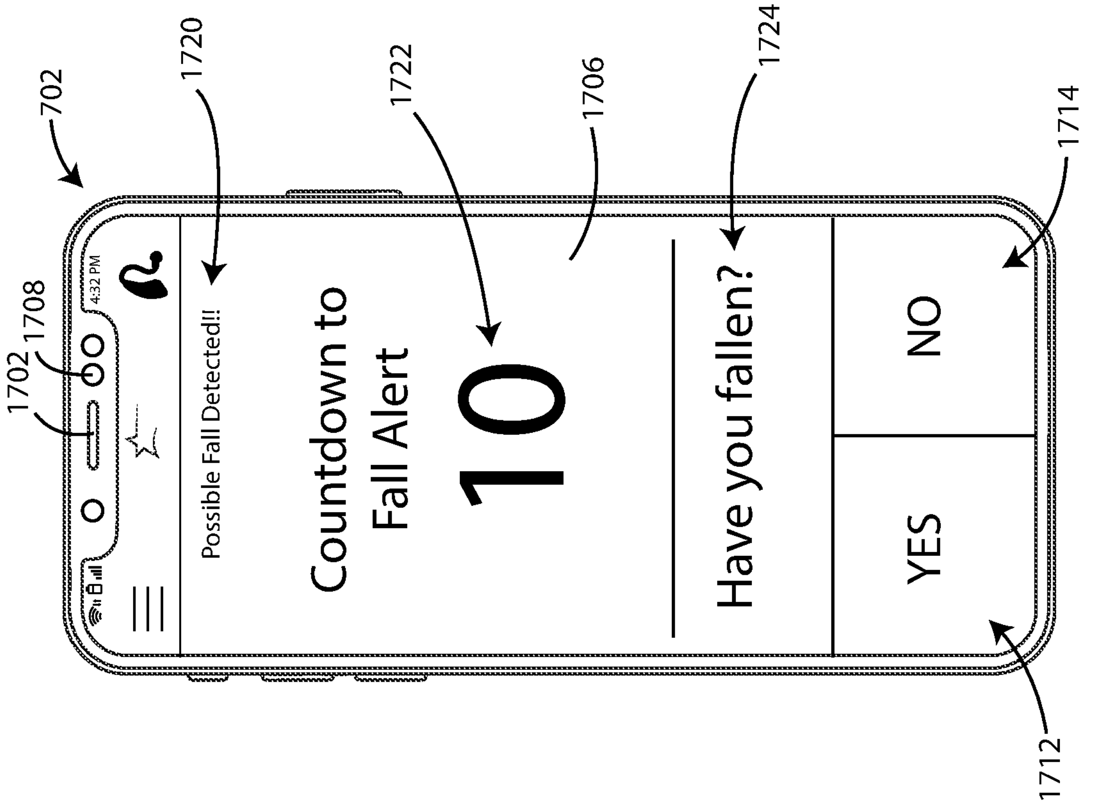
FIG. 17 is a schematic view of an external visual display device and elements of a display screen thereof in accordance with various embodiments herein.

Referring now to FIG. 17, a schematic view is shown of a display screen 1706 of an accessory device 702. Many visual display options are contemplated herein. In specific, visual elements of the display screen 1706 are shown in accordance with various embodiments herein. The accessory device 702 can include a speaker 1702. The accessory device 702 can generate and/or display a user interface and the display screen 1706 can be a touchscreen to receive input from the subject/user. In some embodiments, the accessory device 702 can include a camera 1708. The display screen 1706 visual elements can include a fall detection notification element 1720. In some cases, the fall detection notification element 1720 can indicate whether binaural or monaural detection of a fall has occurred. The display screen 1706 visual elements can also include a countdown clock or timer 1722, which can function to allow the subject/user a predetermined amount of time to cancel a fall alert. In some embodiments, the option to cancel the fall alert is only provided if detection of the fall is monaural. In some embodiments, the amount of time on the countdown clock or timer 1722 is dependent on whether the fall detection was binaural or monaural, with more time provided if the detection was monaural and not binaural. The display screen 1706 visual elements can include a query to the subject/user regarding the possible fall 1724. The display screen 1706 visual element can also include virtual buttons 1712, 1714 in order to allow the subject/user to provide an indication of whether or not a fall has occurred and/or whether or not the subject sustained an injury as a result of the fall. Timers herein can be count-down timers or count-up timers. The hearing assistance device can be further configured to initiate a timer if a possible fall of the subject is detected and initiate issuance of a fall alert if the timer reaches a threshold value. In some embodiments, the timer is a count-down timer and the threshold value is zero seconds. In some embodiments, the timer is a count-up timer and the threshold value is from 5 to 600 seconds.

Figure 18:
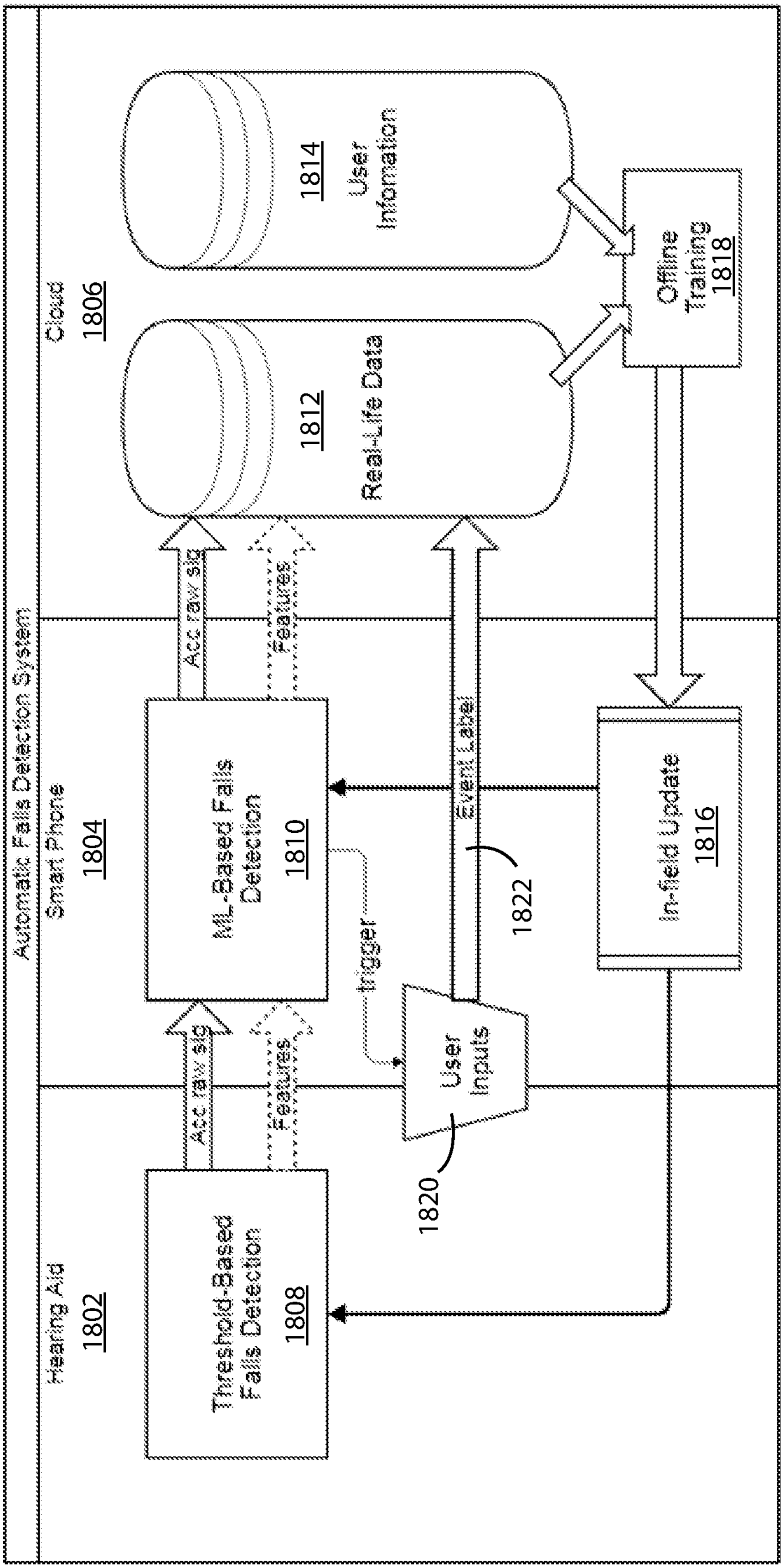
FIG. 18 is a diagram is shown of various embodiments of systems herein can operate and interface with one another.

It will be appreciated that, as part of an overall system, various processing steps or operations can be performed at various levels including at the level of the hearing assistance device, an accessory device, on a server (real or virtual) in the cloud, etc. Referring now to FIG. 18, a diagram is shown of various embodiments of systems herein can operate and interface with one another. In various embodiments, at the level of the hearing assistance device 1802 (or hearing aid) a threshold-based falls detection approach 1808 can be used. Fall detection techniques are described in greater detail below. Threshold-based falls detection is less computationally intense than some other approaches and can be ideal for execution on a device with finite processing and power resources. In some cases, an accelerometer signal (raw or processed) can be transmitted from the hearing assistance device 1802 to an accessory device 1804 (such as a smart phone). For example, if the hearing assistance device detects a possible fall (such as using a threshold-based method) an accelerometer signal can be transmitted from the hearing assistance device 1802 to an accessory device 1804 (such as a smart phone). This can allow for using the processing resources of the accessory device 1804 to evaluate the accelerometer signal using, for example, a pattern-based or machine-learning based technique 1810 in order to detect a possible fall and/or verify what the hearing assistance device indicates. In some cases, the hearing assistance device can also process the accelerometer signals (or other sensor signals) and extract features of the same and transmit those on to the accessory device 1804. In some cases, an accelerometer signal (raw or processed) can be transmitted from the accessory device 1804 to processing resources in the cloud 1806. For example, if the hearing assistance device and/or accessory device detects a possible fall an accelerometer signal can be transmitted from the hearing assistance device 1802 to the accessory device 1804 (such as a smart phone) and onto the cloud 1806. In some cases, the accessory device 1804 can also process the accelerometer signals (or other sensor signals) and extract features of the same and transmit those on to the cloud 1806.

In some cases, detection of a possible fall at the level of the accessory device 1804 can trigger a query to the hearing assistance device wearer. Such queries can be as described elsewhere herein, but in some cases can include verification of a fall having occurred. The system can receive user inputs 1820 at the level of the hearing assistance device 1802 and/or at the level of the accessory device 1804. Using the user inputs 1820, wearer-verified event labels can be applied to the data and locally stored and/or sent on to the cloud. The labels can be matched up with concurrent sensor data (such as accelerometer data) and stored in a database 1812 for later system use. In some embodiments, optionally, user information (age, height, weight, gender, medical history, event history, etc.) can also be stored in a database 1814. Periodically, data from the databases 1812, 1814 can be processed in an offline training operation 1818. Offline training can serve to develop improved patterns and/or algorithms for purposes of classifying future sensor data and identifying future possible fall events. For example, an approach such as a supervised machine learning algorithm (or other machine learning approach) can be applied in order to derive a pattern or signature consistent with a fall and/or a false positive. In this way, the pattern or signature can be updated over time to be more accurate both for a specific subject as well as for a population of subjections. In some embodiments, fall detection sensitivity thresholds may be automatically or dynamically adjusted, for the subject, to capture a greater number of falls as the machine learning techniques improve the system's ability to reject false-positive detections over time. In some embodiments, user input responses regarding whether or not a fall has occurred and/or whether or not the subject sustained an injury as a result of the fall as described previously can be stored with fall data in the cloud and can be used as inputs into machine learning based fall detection algorithm improvement. In various embodiments, the hearing assistance device 1802 and/or the accessory device 1804 can be updated, such as using an in-field update 1816, in order to provide them with improved pattern recognition algorithms resulting from the offline training operation 1818.

Fall Detection

By tracking motion using one or more motion sensors (and in some cases other types of sensors also) and evaluating data from the same, patterns or signatures indicative of a fall can be detected. In some embodiments, patterns or signatures indicative of a fall can include a detected rapid downward movement of a subject's head and/or other body parts (e.g., sudden height change), downward velocity exceeding a threshold value followed by a sudden stop. In some embodiments, patterns or signatures of a fall can include a detected rapid rotation of a subject's head, such as from an upright position to a non-upright position. In various embodiments, patterns or signatures indicative of a fall can include multiple factors including, for example, a rapid downward movement, downward velocity exceeding a threshold value followed by a sudden stop, or a downward rotation of a subject's head and/or other body parts along with other aspects including one or more of the subject's head remaining at a non-upright angle for at least a threshold amount of time, the subject's body in a prone, supine or lying on side position for at least a threshold amount of time, sound indicating an impact, sound indicating a scream, and the like. In some embodiments, the signal strength of wireless communications between various devices may be used to determine the position of an individual, relative to various reflective or absorptive surfaces, at various phases of a fall event, such as the ground.

In some cases, sensor signals can be monitored for a fall and can specifically include classifying pre-fall motion activity, detecting the onset of a falling phase, detecting impacts, and evaluating post-impact activity. To do so, the hearing assistance device can calculate various feature values from motion data, such as vertical acceleration, estimated velocity, acceleration duration, estimated falling distance, posture changes, and impact magnitudes.

Figure 19:
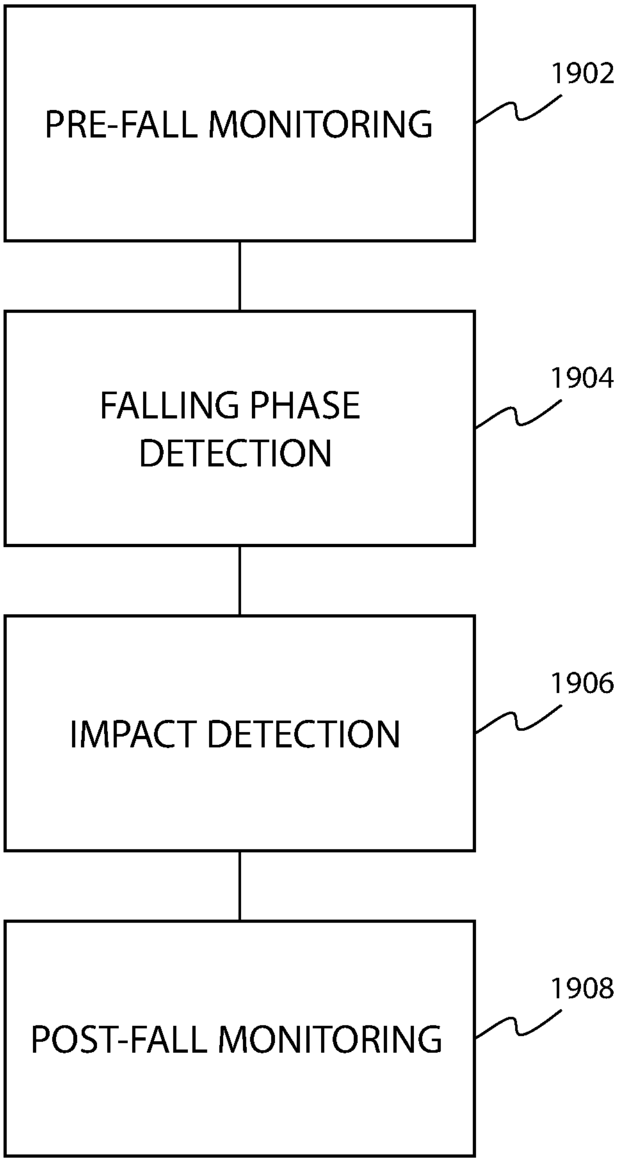
FIG. 19 is a flow diagram illustrating phases of pre-fall monitoring, falling phase detection, impact detection, and post-fall monitoring.

Referring now to FIG. 19, a flow diagram is shown illustrating phases of pre-fall monitoring 1902, falling phase detection 1904, impact detection 1906, and post-fall monitoring 1908. Various evaluations can take place at these different phases. In some embodiments, pre-fall monitoring 1902 can include tracking the total acceleration signal (SV_tot) peaks and comparing them against a threshold value, such as see if they are greater than a threshold. In some embodiments, falling phase detection 1904 can include tracking based on smoothed vertical acceleration, estimating vertical velocity, evaluating against thresholds for duration, minimum SV_tot, and vertical velocity, and monitoring the posture change. In some embodiments, impact detection 1906 can include, within a time window after the falling phase, evaluating against thresholds for the width and amplitude of the vertical acceleration peaks, SV_tot amplitude thresholding based on the pre-fall peaks, and monitoring the posture change. The duration of time between the onset of a fall to the time of the last impact peak can be evaluated and should generally be longer than about 0.2, 0.3, 0.4, or 0.5 seconds (with a shorter time indicating the what was detected was not actually a fall). In some embodiments, post-fall monitoring 1908 can include lying posture detection based on the estimated direction of gravity, and low activity level detection.

Figure 20:
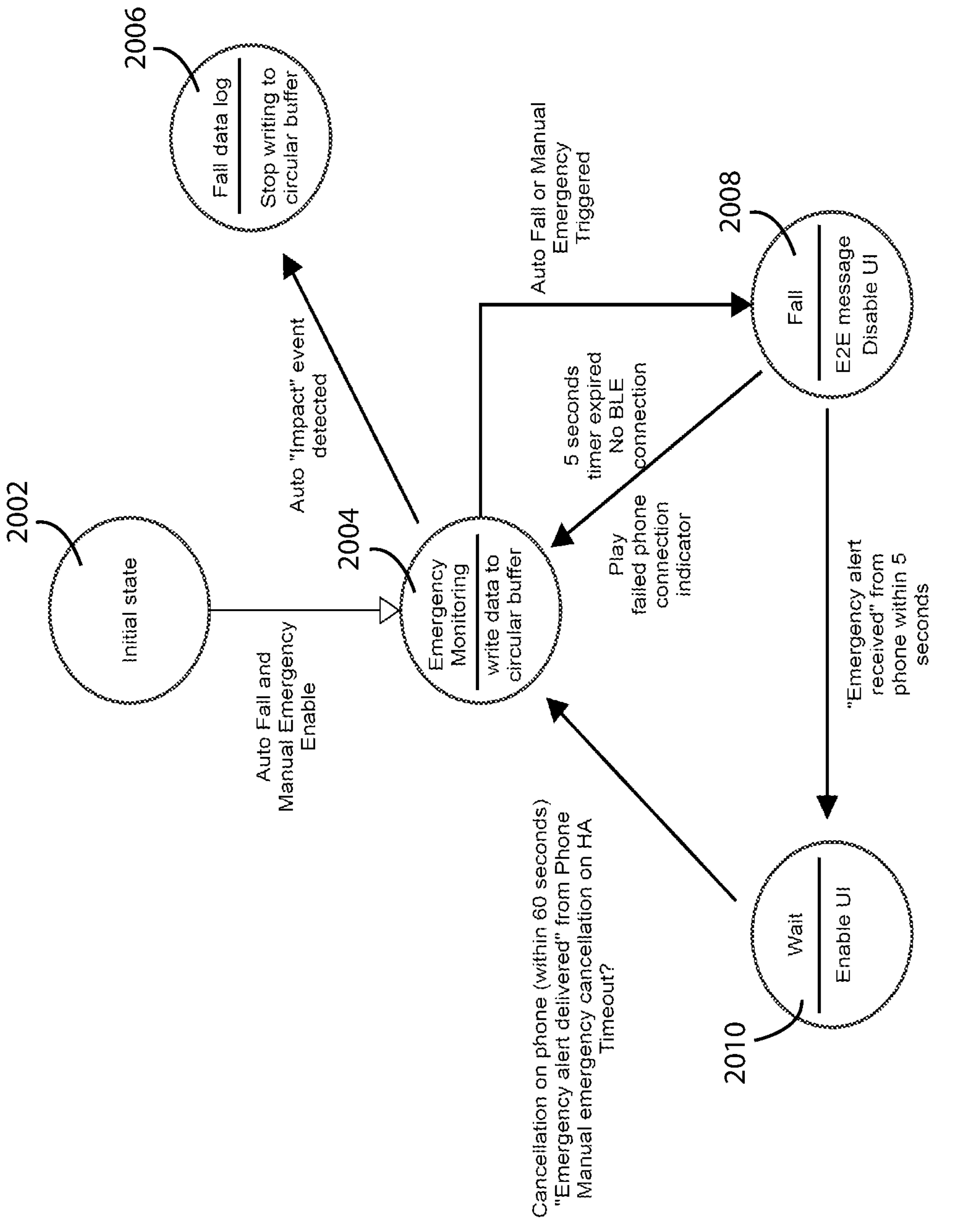
FIG. 20 is a flow diagram illustrating operations that can occur related to detection of a possible fall event While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

Referring now to FIG. 20, a flow diagram is shown illustrating operations that can occur related to detection of a possible fall event. In an initial state 2002, a professional is able to activated/deactivate availability of the feature. If active, a device wearer is able to set up contacts. Once at least one contact is active, system is "Enabled".

In a monitoring state 2004, emergency system is active, so IMU data is written to a circular buffer and monitored for a fall.

In a first fall detected state 2006 flow, fall data is logged and stored with data from the circular buffer, in some embodiments further writing of data to the circular buffer can be temporarily suspended. IMU data from the circular buffer (before, during, and for a period of time after a fall event) can be shared between ears, with accessory, stored in the cloud and associated with other data (timestamp, user data, settings data, IMU/fall detection features data, etc.)

In a second fall detected state 2008 flow (which can be simultaneous with the first), data and communication can be shared between hearing assistance devices and/or with the accessory device. In addition, user controls can be selectively enabled/changed. For example, when a pending fall alert is active, volume and memory controls become cancellation user controls. In some embodiments, a first timer (such as 5 seconds) can be set in which the hearing assistance device tries to contact the accessory device and/or the cloud. The verification of communication with the accessory device and/or the cloud is not achieved within the time limit then a message can be played for the device wearer indicating that communication with the phone and/or the cloud has failed. Conversely, if communication has been achieved then a successful communication message can be played and the system can advance to a wait state 2010 giving the a fixed time period (such as 60 seconds) in which to cancel the alert. For example, the device wearer can interface with the hearing assistance device(s) and/or the accessory device in order to cancel the alert. The accessory device and/or the cloud can wait for the cancelation control notification and if a notification that the subject has canceled the alert is received by the cloud, then the alert is not delivered to contacts. However, if no cancellation notification is received in 60 seconds, then designated contacts are sent messages. At various points, user controls can be selectively re-enabled/changed. For example, user controls can be selectively re-enabled/changed as the wait state 2010 begins.

The signal of an IMU or accelerometer can be considered as $\vec{g}=\hat{a}-\hat{g}$, where is the acceleration and $-\hat{g}$ is the bias. The direction of $\hat{g}$ (gravity) is in the negative z direction, therefore, the bias is in the positive z direction. By determining the directionality of the bias, the direction of gravity can be derived. By knowing the direction of gravity relative to a device, the posture of the device wearer can be derived (e.g., standing, lying face up, lying face down, etc.). In addition, in various embodiments herein, the direction of gravity can be determined and compared between hearing assistance devices. If both devices are being worn, then the direction of gravity should be within a given amount of each other (such as within 10, 5 or 3 degrees). If the direction of gravity is not comparable between the two devices, then this can be taken as an indication that one or both of the devices is no longer being worn by the device wearer. In such as case, data indicting a possible fall can be ignored or otherwise not acted upon by the system, particularly where only one device indicates a possible fall but its indicated direction of gravity has changed with respect to the other device.

In some embodiments, devices (hearing assistance or accessory) and/or systems herein are configured to evaluate data from one or more sensors to detect a possible fall of a subject in physical contact with the hearing assistance device by evaluating at least one of timing of steps and fall detection phases (including, but not limited to a pre-fall phase, a falling phase, an impact phase, and a resting phase), degree of acceleration changes, direction of acceleration changes, peak acceleration changes, activity classification, and posture changes.

In some cases, multiple algorithms for fall detection can be used, with one or more being more highly sensitive and one or more producing fewer false positives.

In some embodiments herein, patterns or signatures of a fall for a particular subject can be enhanced over time through machine learning analysis. For example, the subject (or a third party) can provide input as to the occurrence of falls and/or the occurrence of false-positive events. These occurrences of falls and/or false positives can be paired with data representing data gathered at the time of these occurrences. Then, an approach such as a supervised machine learning algorithm can be applied in order to derive a pattern or signature consistent with a fall and/or a false positive. In this way, the pattern or signature can be updated over time to be more accurate both for a specific subject as well as for a population of subjections. In some embodiments, fall detection sensitivity thresholds may be automatically or dynamically adjusted, for the subject, to capture a greater number of falls as the machine learning techniques improve the system's ability to reject false-positive detections over time. In some embodiments, user input responses regarding whether or not a fall has occurred and/or whether or not the subject sustained an injury as a result of the fall as described previously can be stored with fall data in the cloud and can be used as inputs into machine learning based fall detection algorithm improvement. These data may also be used to calculate statistics relative to the subject's risk for future falls.

In some embodiments, an assessed fall risk can be used as a factor in determining whether a fall has occurred. For example, a fall risk can be calculated according to various techniques, including, but not limited to techniques described in U.S. Publ. Pat. Appl. Nos. 2018/0228405; 2018/0233018; and 2018/0228404, the content of which is herein incorporated by reference. The assessed fall risk can then be applied such that the system is more likely to indicate that a fall has occurred if the assessed fall risk was relatively high immediately before the occurrence in question. In some embodiments, the assessed fall risk can be applied transitorily such that the system is only more likely to indicate that a fall has occurred for a period of seconds or minutes. In other embodiments, the assessed fall risk can be applied over a longer period of time.

In some embodiments, device settings can include a fall detection sensitivity setting such that the subject or a third party can change the device or system settings such that the fall detection criteria becomes more or less sensitive. In some cases, sensitivity control can relate to implementing/not implementing some of the aspects that relate to reducing false positives. In other words, sensitivity control may not be just related to thresholds for sensitivity, but also related to thresholds for specificity.

In some embodiments, a log of detected falls can be stored by one or more devices of the system and periodically provided to the subject or a third party, such as a responsible third party and/or a care provider. In some embodiments, a log of near-falls or balance events can be stored by one or more devices of the system and periodically provided to the subject or a third party, such as a responsible third party and/or a care provider. A near-fall herein can be an occurrence that fails to qualify as a fall, but comes close thereto (such as missing the criteria for a fall be less than 5%, 10%, 20%, or 30% for example).

Aspects of evaluating data to detect possible falls are described in greater detail in U.S. Publ. Pat. Appl. Nos. 2018/0228404 and 2018/0233018, the content of which is herein incorporated by reference.

Sensors

Systems herein can include one or more sensor packages to provide data in order to determine aspects including, but not limited to, tracking movement of a subject and tracking head position of the subject. The sensor package can comprise one or a multiplicity of sensors. In some embodiments, the sensor packages can include one or more motion sensors amongst other types of sensors. Motion sensors herein can include inertial measurement units (IMU), accelerometers, gyroscopes, barometers, altimeters, and the like. Motions sensors can be used to track movement of a subject in accordance with various embodiments herein.

In some embodiments, the motion sensors can be disposed in a fixed position with respect to the head of a subject, such as worn on or near the head or ears. In some embodiments, the motion sensors can be associated with another part of the body such as on a wrist, arm, or leg of the subject.

Sensor packages herein can also include one or more of a magnetometer, microphone, acoustic sensor, electrocardiogram (ECG), electroencephalography (EEG), eye movement sensor (e.g., electrooculogram (EOG) sensor), myographic potential electrode (EMG), heart rate monitor, pulse oximeter, blood pressure monitor, blood glucose monitor, thermometer, cortisol level monitor, and the like.

In some embodiments, the sensor package can be part of a hearing assistance device. However, in some embodiments, the sensor packages can include one or more additional sensors that are external to a hearing assistance device. The one or more additional sensors can comprise one or more of an IMU, accelerometer, gyroscope, barometer, magnetometer, an acoustic sensor, eye motion tracker, EEG or myographic potential electrode (e.g., EMG), heart rate monitor, pulse oximeter, blood pressure monitor, blood glucose monitor, thermometer, and cortisol level monitor. For example, the one or more additional sensors can include a wrist-worn or ankle-worn sensor package, a sensor package supported by a chest strap, a sensor package integrated into a medical treatment delivery system, or a sensor package worn inside the mouth.

The sensor package of a hearing assistance device can be configured to sense motion of the wearer. Data produced by the sensor(s) of the sensor package can be operated on by a processor of the device or system.

According to various embodiments, the sensor package can include one or more of an IMU, and accelerometer (3, 6, or 9 axis), a gyroscope, a barometer, an altimeter, a magnetometer, an eye movement sensor, a pressure sensor, an acoustic sensor, a heart rate sensor, an electrical signal sensor (such as an EEG, EMG or ECG sensor), a temperature sensor, a blood pressure sensor, an oxygen saturation sensor, a blood glucose sensor, a cortisol level sensor, an optical sensor, and the like.

As used herein the term "inertial measurement unit" or "IMU" shall refer to an electronic device that can generate signals related to a body's specific force and/or angular rate. IMUs herein can include one or more of an accelerometer and gyroscope (3, 6, or 9 axis) to detect linear acceleration and a gyroscope to detect rotational rate. In some embodiments, an IMU can also include a magnetometer to detect a magnetic field. In some embodiments, an IMU can also include a barometer.

In will be appreciated that sensors herein, such as IMU sensors, can be calibrated. In some embodiments, sensors herein can be calibrated in situ. Such calibration can account for various factors including sensor drift and sensor orientation differences. Sensors herein can be calibrated in situ in various ways including, having the device wearer walk and detecting the direction of gravity, through guided head movements/gestures, or the like. In some embodiments, each hearing assistance device of a pair can calibrate itself. In some embodiments, calibration data can be shared between hearing assistance devices.

The eye movement sensor may be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor and the like.

Figure 11:
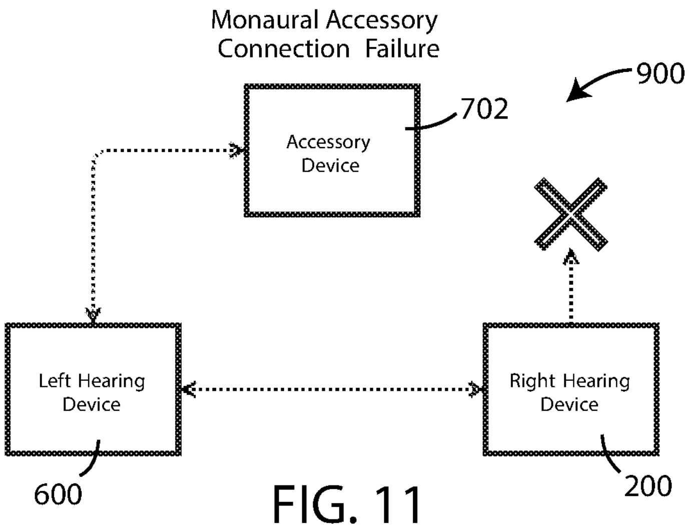
FIG. 11 is a schematic diagram of connections between system components when communication between one hearing assistance device and an accessory device is inoperative.

According to a least some embodiments, the wireless radios of one or more of the right hearing assistance devices, the left hearing assistance devices, and an accessory may be leveraged to gauge the strength of the electromagnetic signals, received at one or more the wireless devices, relative to the radio output at one or more of the wireless devices. In at least one embodiment, a loss of connectivity between the accessory device and one of either the right hearing assistance device or the left hearing assistance device, as depicted in FIG. 11, may be indicative of a fall where the individual lays to one's side.

The temperature sensor can be, for example, a thermistor (thermally sensitive resistor), a resistance temperature detector, a thermocouple, a semiconductor-based sensor, an infrared sensor, or the like.

The blood pressure sensor can be, for example, a pressure sensor. The heart rate sensor can be, for example, an electrical signal sensor, an acoustic sensor, a pressure sensor, an infrared sensor, an optical sensor, or the like.

The oxygen saturation sensor can be, for example, an optical sensor, an infrared sensor, or the like.

The blood glucose sensor can be, for example, an electrochemical HbA1c sensor, or the like.

The electrical signal sensor can include two or more electrodes and can include circuitry to sense and record electrical signals including sensed electrical potentials and the magnitude thereof (according to Ohm's law where V=IR) as well as measure impedance from an applied electrical potential.

The sensor package can include one or more sensors that are external to the hearing assistance device. In addition to the external sensors discussed hereinabove, the sensor package can comprise a network of body sensors (such as those listed above) that sense movement of a multiplicity of body parts (e.g., arms, legs, torso).

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like. It should be appreciated that the phrase "generating sound" may include methods which provide an individual the perception of sound without the necessity of producing acoustic waves or vibration.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A head-wearable device comprising:

a first control circuit;

a first motion sensor in electrical communication with the first control circuit;

a first power supply circuit in electrical communication with the first control circuit;

a first sensor; and a second sensor, wherein the second sensor is external to the head-wearable device;

wherein the first control circuit is configured to:

evaluate data from the first sensor and the second sensor to detect a possible fall of a subject in physical contact with the device; and if a possible fall is detected by both the first sensor and the second sensor, wirelessly transmit data regarding a possible fall to another device including an indication that the possible fall was detected binaurally, and issue a fall alert;

if a possible fall is detected by only one of the first sensor and the second sensor, wirelessly transmit data regarding a possible fall to another device including an indication that the possible fall was detected monoaurally, and either do not issue a fall alert or issue a monoaural fall alert along with an option for the subject to cancel the monoaural fall alert.

2. The head-wearable device of claim 1, wherein the first control circuit is further configured to initiate a timer if a possible fall of the subject is detected; and initiate issuance of a fall alert if the timer reaches a threshold value.

3. The head-wearable device of claim 2, the first control circuit further configured to monitor for a cancellation command from the subject to cancel the timer; and initiate issuance of a fall alert if the timer reaches a threshold value and a cancellation command has not been detected.

4. The head-wearable device of claim 1, the data including one or more of motion sensor data, physiological data regarding the subject, and environmental data relative to a location of the subject.

5. The head-wearable device of claim 4, the physiological data regarding the subject comprising one or more of heart rate data, blood pressure data, core temperature data, electromyography (EMG) data, electrooculography (EOG) data, and electroencephalogram (EEG) data.

6. The head-wearable device of claim 4, the environmental data relative to the location of the subject comprising one or more of location services data, magnetometer data, ambient temperature, and contextual data.

7. The head-wearable device of claim 1, wherein the hearing assistance device is configured to evaluate data from one or more sensors to detect a possible fall of a subject in physical contact with the hearing assistance device by evaluating at least one of timing of steps and fall detection phases, degree of acceleration changes, activity classification, and posture changes.

8. The head-wearable device of claim 1, wherein the hearing assistance device is configured to evaluate data from one or more sensors to detect a possible fall of a subject in physical contact with the hearing assistance device by evaluating at least one of vertical acceleration, estimated velocity, acceleration duration, estimated falling distance, posture changes, and impact magnitudes.

9. The head-wearable device of claim 1, the hearing assistance device further configured to save data including at least one of motion sensor data, processed motion sensor data, motion feature data, detection state data, physiological data regarding the subject, and environmental data relative to a location of the subject and transmit the data wirelessly.

10. The head-wearable device of claim 1, wherein the hearing assistance device is configured to detect a possible fall of the subject only when a threshold amount of time has passed since the hearing assistance device has been powered on, placed on or in an ear, or otherwise activated.

11. The head-wearable device of claim 1, wherein the hearing assistance device is configured to detect a possible fall of the subject only when the hearing assistance device is being worn by the subject.

12. A head-wearable device comprising:

a first control circuit;

a first motion sensor in electrical communication with the first control circuit;

a first power supply circuit in electrical communication with the first control circuit;

a first sensor; and a second sensor, wherein the second sensor is external to the head-wearable device;

wherein the first control circuit is configured to:

evaluated data from the first sensor and the second sensor detect a possible fall of a subject in physical contact with the device; and if a possible fall is detected by both the first sensor and the second sensor, wirelessly transmit data regarding a possible fall to another device including an indication that the possible fall was detected binaurally, and issue a binaural fall alert;

if a possible fall is detected by only one of the first sensor and the second sensor, wirelessly transmit data regarding a possible fall to another device including an indication that the possible fall was detected monoaurally, issue a monoaural fall alert;

wirelessly transmit data regarding a possible fall to another device including an indication of whether the possible fall was detected binaurally or monoaurally.

* * * * *